US010633545B2

(12) United States Patent
Merten et al.

(10) Patent No.: US 10,633,545 B2
(45) Date of Patent: Apr. 28, 2020

(54) ALCOHOL-RESISTANT, CHEMICALLY-STRIPPABLE FLOOR COATING AND COMPOSITION FOR MAKING SAME

(71) Applicant: DIVERSEY, INC., Fort Mill, SC (US)

(72) Inventors: Anthony Merten, Mt. Pleasant, WI (US); Harry T. Mills, Racine, WI (US); Andrew Movrich, Milwaukee, WI (US); Eric Loterbaugh, Racine, WI (US)

(73) Assignee: Diversey, Inc., Fort Mill, SC (US)

( * ) Notice: Subject to any disclaimer, the term of this patent is extended or adjusted under 35 U.S.C. 154(b) by 102 days.

(21) Appl. No.: 15/755,718

(22) PCT Filed: Aug. 31, 2016

(86) PCT No.: PCT/US2016/049699
§ 371 (c)(1),
(2) Date: Feb. 27, 2018

(87) PCT Pub. No.: WO2017/040662
PCT Pub. Date: Mar. 9, 2017

(65) Prior Publication Data
US 2019/0023907 A1    Jan. 24, 2019

Related U.S. Application Data

(60) Provisional application No. 62/212,108, filed on Aug. 31, 2015.

(51) Int. Cl.
| | |
|---|---|
| *C09D 5/00* | (2006.01) |
| *C09D 175/04* | (2006.01) |
| *C08G 18/79* | (2006.01) |
| *C08L 75/04* | (2006.01) |
| *C09D 7/61* | (2018.01) |
| *C09D 7/20* | (2018.01) |
| *C09D 7/47* | (2018.01) |
| *C09D 7/63* | (2018.01) |
| *C09D 175/16* | (2006.01) |
| *E04F 15/00* | (2006.01) |

(52) U.S. Cl.
CPC .......... *C09D 5/008* (2013.01); *C08G 18/797* (2013.01); *C08L 75/04* (2013.01); *C09D 7/20* (2018.01); *C09D 7/47* (2018.01); *C09D 7/61* (2018.01); *C09D 7/63* (2018.01); *C09D 175/04* (2013.01); *C09D 175/16* (2013.01); *E04F 15/00* (2013.01)

(58) Field of Classification Search
CPC ....... C08G 18/797; C08L 75/04; C09D 5/008; C09D 7/20; C09D 7/47; C09D 7/61; C09D 7/63; C09D 175/04; C09D 175/16
See application file for complete search history.

(56) References Cited

U.S. PATENT DOCUMENTS

| | | |
|---|---|---|
| 2,899,318 A | 8/1959 | Long |
| 3,255,872 A | 6/1966 | Long |
| 3,887,346 A | 6/1975 | Erdman |
| 4,278,578 A | 7/1981 | Carpenter |
| 4,540,089 A | 9/1985 | Maloney |
| 4,805,767 A | 2/1989 | Newman |
| 5,330,788 A * | 7/1994 | Roberts .................. C09D 5/008 134/38 |
| 5,603,729 A | 2/1997 | Brown |
| 7,396,891 B2 | 7/2008 | Gray |
| 8,006,844 B2 | 8/2011 | McKinley |
| 9,004,761 B2 | 4/2015 | Balteau |
| 10,011,399 B1 | 7/2018 | Adell |
| 2011/0100844 A1 | 5/2011 | Cimaglio |
| 2011/0132782 A1 | 6/2011 | Ilfrey |
| 2012/0107508 A1 | 5/2012 | Li |
| 2012/0201963 A1 | 8/2012 | Li |
| 2015/0203275 A1 | 7/2015 | May |

FOREIGN PATENT DOCUMENTS

| | | |
|---|---|---|
| WO | 94/13723 | 6/1994 |
| WO | 2017040668 A1 | 3/2017 |

OTHER PUBLICATIONS

PCT/US2016/049699 International Search Report and Written Opinion of the International Searching Authority dated Nov. 24, 2016 (9 pages).
PCT/US2016/049699 International Preliminary Report of Patentability of the International Searching Authority dated Mar. 6, 2018 (1 pages).

* cited by examiner

*Primary Examiner* — Christopher M Rodd
(74) *Attorney, Agent, or Firm* — Warunee Srisiri-Sisson

(57) ABSTRACT

A chemically-strippable, alcohol-resistant floor coating contains a crosslinked polymer, an alkali soluble resin, and an amine functional compound. The coating exhibits a Strippability Level of at least 40% after 300 cycles in a solvent on an abrasion machine, and an Ethanol Resistance of at least 60 percent, as measured by a 60° Gloss Retention Test. A floor coating composition comprising an aqueous dispersion of a crosslinkable polymer, an alkali soluble resin, an amine functional compound, and a crosslinker can be applied to a floor to make the coating.

20 Claims, 11 Drawing Sheets

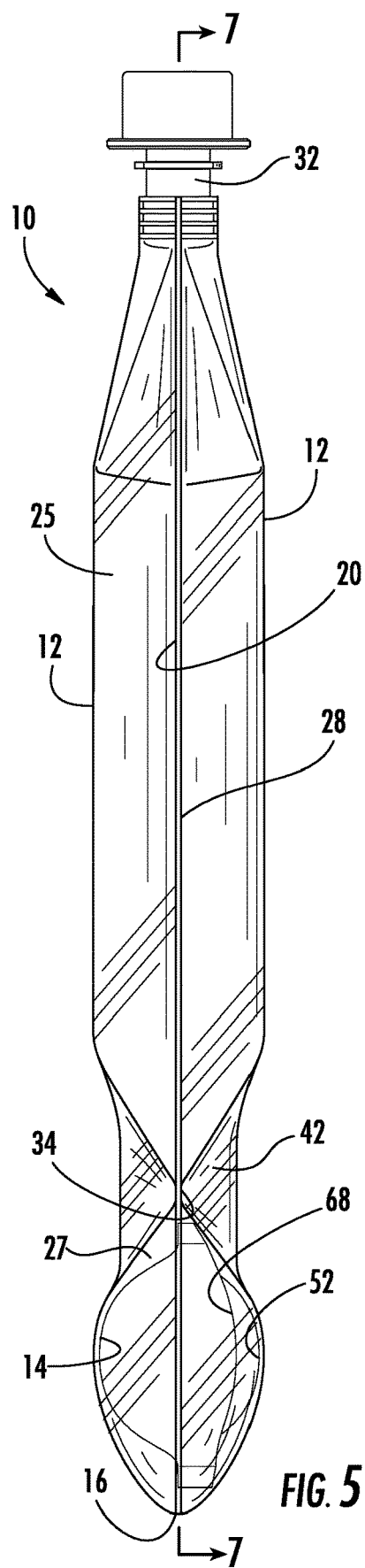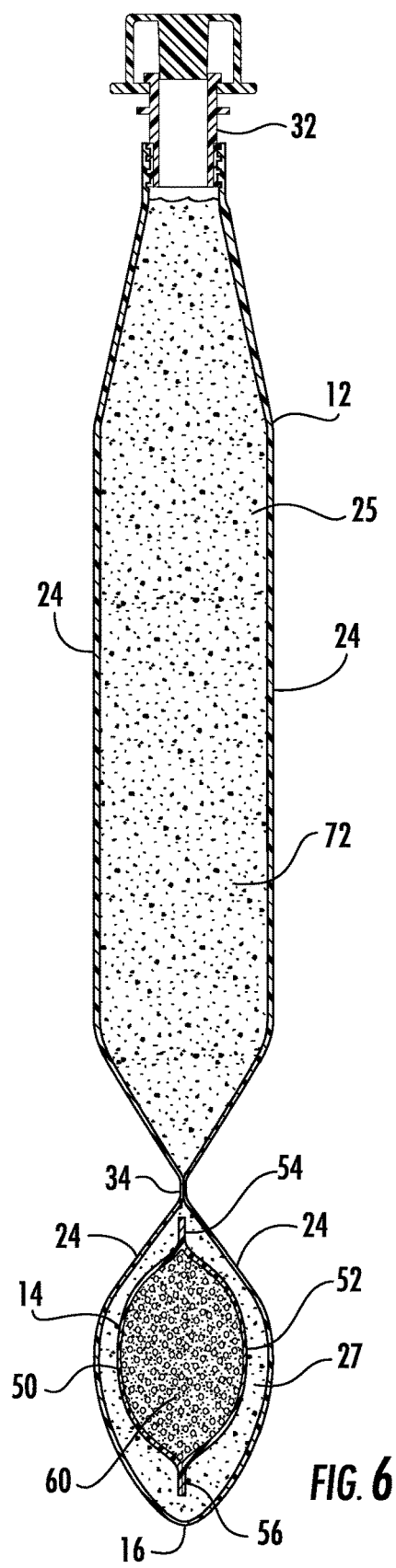
FIG. 5
FIG. 6

ALCOHOL-RESISTANT, CHEMICALLY-STRIPPABLE FLOOR COATING AND COMPOSITION FOR MAKING SAME

CROSS-REFERENCE TO RELATED APPLICATION

This present patent application is a national stage filing under 35 U.S.C. § 371 of International Application No. PCT/US2016/049699, filed on Aug. 31, 2016, which claims priority to U.S. Provisional Application No. 68/212,108 filed on Aug. 31, 2015, the content of which are incorporated fully herein by reference in their entirety.

FIELD

The present invention relates to floor finishes, and more particularly to alcohol-resistant, chemically-strippable polyurethane floor finishes.

BACKGROUND

Conventional floor finishes are periodically applied to a variety of flooring substrates such as vinyl composition tile, stone, terrazzo, linoleum, wood, etc., to improve use life and to enhance the visual appearance of the floor. Acrylic floor finish can be applied with a mop and removed with chemical stripper. However, acrylic finish is not alcohol-resistant. Alcohol-resistance has become increasingly important with the increasing use of alcohol-based hand sanitizers, which have come into extensive use in hospitals, airports, homes, and elsewhere. If an alcohol-based hand sanitizer spills onto a floor having an acrylic finish, after a short period of time the hand sanitizer visually and chemically degrades the finish, Although conventional polyurethane floor finish is alcohol-resistant and can be applied with a mop, it cannot be readily removed with chemical floor stripper. Rather, removal of conventional polyurethane floor finish is carried out using an abrasive to grind the finish off the flooring substrate.

Recently a chemically-strippable polyurethane floor finish system has been commercialized. This polyurethane floor finish system has a relatively high degree of alcohol-resistance, while also being chemically-strippable. This floor finish system is a two-component system in which a polyol component is mixed with a polyisocyanate component shortly before the mixture is applied to a substrate, such as a flooring substrate. The mixture has a limited pot life as the polyol reacts with the polyisocyanate to form a polyurethane network, i.e., eventually becoming so viscous that if not used by that point, it loses utility because it is too viscous to be applied to a substrate and form a film therewith. The two-component system has a pot life of from 3-10 hours during which the coating material has suitable viscosity for its intended use in floor application procedures as the polyol and polyisocyanate react to form the crosslinked polyurethane.

The commercially-available stripper for the removal of the commercial coating, although VOC-compliant (i.e., volatile organic compound-compliant) contains potassium hydroxide. The label on the stripper states that it not recommended for use on linoleum, rubber, marble, or wood floors. The label further states that the stripper is recommended for use on vinyl composition tile, vinyl asbestos tile, ceramic tile, terrazzo, and concrete floors. The recommendation against the use of the stripper on linoleum, rubber, marble, and wood may be due to the presence of the potassium hydroxide, which may cause damage to linoleum, rubber, marble, and/or wood flooring substrates.

It would be desirable to provide an alcohol-resistant polyurethane floor coating which is chemically-strippable and is easier to chemically strip with a stripper free of a caustic component. It would be desirable if the coating is chemically strippable with a wide variety of chemical strippers, including strippers compatible with stripping the coating composition from linoleum, rubber, marble, and/or wood flooring substrates, as well as strippers incompatible stripping the coating composition from linoleum, rubber, marble, and/or wood flooring substrates. It would also be desirable to provide a coating system that has a pot life long enough to allow excess composition to be stored for 2 to 10 days or more without exceeding the pot life.

SUMMARY

A new chemically-strippable, alcohol-resistant polyurethane floor coating has been discovered which is relatively easy to strip with a chemical stripper free of a caustic component. The new coating is chemically strippable with a wide variety of chemical strippers, including strippers compatible with stripping the coating composition from linoleum, rubber, marble, and/or wood flooring substrates, as well as strippers incompatible stripping the coating composition from linoleum, rubber, marble, and/or wood flooring substrates. Moreover, the new coating can be prepared from a two-component coating composition having a pot life of up to 10 days or even more after the components are mixed.

A first aspect is directed to a coated floor comprising a flooring substrate and a chemically-strippable, alcohol-resistant coating on the flooring substrate. The coating comprises crosslinked polymer, an alkali soluble resin, and an amine functional compound. The crosslinked polymer is selected from the group consisting of crosslinked polyurethane, crosslinked acrylic polymer, and crosslinked polyurea. The coating exhibits: (a) a Strippability Level of at least 40% as measured by percent coating stripped from a tile after 300 cycles using a modified ASTM D-1792 procedure with a stripping solution consisting of 4 wt % monoethanolamine, 1 wt % diethyleneglycol butylether, 0.1% ethylenediamine tetracetic acid, 0.25 wt % $C_{9-11}$ alcohol ethoxylate, 2.6 wt % benzyl alcohol, and 92.05 wt % water, and (b) an Ethanol Resistance of at least 60 percent, as measured by a 60° Gloss Retention Test re upon exposure to 0.33 milliliter/in$^2$ of a blend of 67.5 wt % ethanol 32.5 wt % water for a period of 60 minutes at 72° F. and relative humidity of 50%, wherein:

$$R_{Et} = \%60° \text{ Gloss Retention}_{Et} = 100\% - [(60° \text{ GU@}T_o - 60° \text{ GU@}T_{Et})/60° \text{ GU@}T_o] \times 100\%.$$

Strippability Level is measured by the Strippability Test described below. Ethanol Resistance is determined in accordance with the Ethanol Resistance Test disclosed hereinbelow. The terms and phrases "$R_{Et}$", "60° Gloss Retention$_{Et}$", "GU", "$T_o$", and "$T_{Et}$" are defined in the Ethanol Resistance Test disclosed hereinbelow.

In an embodiment, the crosslinked polymer is present in the coating in an amount of from 30 to 98 wt % based on coating weight, the alkali soluble resin is present in the coating in an amount of from 1 to 15 wt %, based on coating weight, and the amine functional compound is present in the coating in an amount of from 0.1 to 10 wt %, based on coating weight.

In an embodiment, the crosslinked polymer is present in the coating in an amount of from 60 to 95 wt % based on coating weight, the alkali soluble resin is present in the coating in an amount of from 2 to 12 wt %, based on coating weight, and the amine functional compound is present in the coating in an amount of from 0.5 to 6 wt %, based on coating weight.

In an embodiment, the crosslinked polymer is present in the coating in an amount of from 70 to 92 wt % based on coating weight, the alkali soluble resin is present in the coating in an amount of from 3 to 10 wt %, based on coating weight, and the amine functional compound is present in the coating in an amount of from 0.75 to 7 wt %, based on coating weight.

In an embodiment, the crosslinked polymer is present in the coating in an amount of from 80 to 90 wt % based on coating weight, the alkali soluble resin is present in the coating in an amount of from 3 to 7 wt %, based on coating weight, and the amine functional compound is present in the coating in an amount of from 1 to 7 wt %, based on coating weight.

In an embodiment, the crosslinked polymer is formed by crosslinking an polyurethane with a carbodiimide, and the crosslinked polymer is present in an amount of from 60 to 95 wt % based on coating weight, the alkali soluble resin is present in the coating in an amount of from 2 wt % to 10 wt %, based on coating weight, and the amine functional compound is present in the coating in an amount of from 1 to 5 wt %, based on coating weight.

In an embodiment, the crosslinked polymer is formed by crosslinking an polyurethane with a carbodiimide, and the crosslinked polymer is present in an amount of from 70 wt % to 92 wt % based on coating weight, the alkali soluble resin is present in the coating in an amount of from 3 wt % to 8 wt %, based on coating weight, and the amine functional compound is present in the coating in an amount of from 2 wt % to 4 wt %, based on coating weight.

In an embodiment, the crosslinked polymer is formed by crosslinking a polyol with a polyisocyanate, and the crosslinked polymer is present in an amount of from 60 wt % to 95 wt % based on coating weight, the alkali soluble resin is present in the coating in an amount of from 4 wt % to 12 wt %, based on coating weight, and the amine functional compound is present in the coating in an amount of from 1 to 8 wt %, based on coating weight.

In an embodiment, the crosslinked polymer is formed by crosslinking a polyol with a polyisocyanate, and the crosslinked polymer is present in an amount of from 70 wt % to 92 wt % based on coating weight, the alkali soluble resin is present in the coating in an amount of from 5 wt % to 9 wt %, based on coating weight, and the amine functional compound is present in the coating in an amount of from 3 to 7 wt %, based on coating weight.

In an embodiment, the coated floor further comprises a wax. In an embodiment, the coating comprises the wax in an amount of from 5 wt % to 15 wt %, based on coating weight. In an embodiment, the coating comprises the wax in an amount of from 8 wt % to 10 wt %, based on coating weight.

In an embodiment, the coating exhibits an initial 60° gloss of greater than 60 gloss units.

In an embodiment, the coating exhibits a 60° buffed gloss of greater than 60 gloss units.

In an embodiment, the alkali soluble resin has a weight average molecular weight of from 500 to 10,000. In an embodiment, the alkali soluble resin has a weight average molecular weight of from 700 to 5,000. In an embodiment, the alkali soluble resin has a weight average molecular weight of from 1,000 to 3,000. In an embodiment, the alkali soluble resin has a weight average molecular weight of from 1,500 to 2,000.

In an embodiment, the alkali soluble resin comprises at least one member selected from the group consisting of acrylic-acrylic acid resin, styrene-acrylic acid resin, styrene-α-methyl styrene-acrylic acid resin, styrene-acrylic-acrylic acid resin, styrene-α-methyl styrene-acrylic-acrylic acid resin, acrylic-methacrylic acid resin, styrene-methacrylic acid resin, styrene-methyl styrene-methacrylic acid resin, styrene-acrylic-methacrylic acid resin, styrene-α-methyl styrene-acrylic-methacrylic acid resin, styrene-maleic anhydride resin, and polycarboxypolyamide resin.

In an embodiment, the alkali soluble resin has an acid number of at least 100. In an embodiment, the alkali soluble resin has an acid number of from 140 to 400. In an embodiment, the alkali soluble resin has an acid number of from 140 to 400, and a weight average molecular weight of from 1,000 to 3,000, and the alkali soluble resin is not a matting agent.

In an embodiment, the alkali soluble resin comprises at least one member selected from the group consisting of acrylic-acrylic acid resin, styrene-acrylic acid resin, styrene-α-methyl styrene-acrylic acid resin, styrene-acrylic-acrylic acid resin, styrene-α-methyl styrene-acrylic-acrylic acid resin, acrylic-methacrylic acid resin, styrene-acryl-methacrylic acid resin, styrene-methyl styrene-methacrylic acid resin, styrene-acrylic-methacrylic acid resin, styrene-α-methyl styrene-acrylic-methacrylic acid resin, styrene-maleic anhydride resin, and polycarboxypolyamide resin.

In an embodiment, the amine functional compound comprises at least one member selected from the group consisting of primary amine and secondary amine. In an embodiment, the amine functional compound comprises at least one member selected from the group consisting of amine-containing polyester, amine-containing polyacrylate, amine-containing polycarbonate, amine-containing polyurea, amine-containing polybutadiene, amine-containing polyether, amine-containing polyamide, and amine-containing polysiloxane. In an embodiment, the amine functional compound comprises 3-aminopropyl terminated polydimethylsiloxane.

In an embodiment, the crosslinked polymer comprises at least one member selected from the group consisting of crosslinked urethane-acrylic polymer, a crosslinked reaction product of a diol with an aliphatic diisocyanate, and a crosslinked reaction product of a diol with an aromatic diisocyanate.

In an embodiment, the crosslinked polymer comprises polyurethane-acrylic polymer which is a urethane-acrylic hybrid polymer.

In an embodiment, the crosslinked polymer comprises a crosslinked polyurethane comprising a reaction product of a diisocyanate with a diol, wherein the diisocyanate comprises at least one member selected from the group consisting of isophorone diisocyanate, hexamethylene diisocyanate, toluene diisocyanate, and diphenylmethane diisocyanate, and the diol comprises at least one member selected from the group consisting of a diol-containing a polyester, a diol-containing a polyacrylate, a diol-containing polycarbonate, a diol-containing a polyurea, a diol-containing a polybutadiene, a diol-containing a polyether, and a diol-containing a polyamide, and a diol containing polyurethane.

In an embodiment, the coating further comprises zinc oxide.

In an embodiment, the coating further comprises a plasticizer.

A second aspect is directed to a floor coating composition for making a chemically-strippable, ethanol-resistant floor coating. The composition comprises: (A) an aqueous dispersion of at least one crosslinkable polymer, (B) an alkali soluble resin, (C) an amine functional compound, and (D) a crosslinker. The crosslinkable polymer is at least one member selected from the group consisting of crosslinkable polyurethane, crosslinkable acrylic polymer, and crosslinkable polyurea. The floor coating composition, when applied to a flooring substrate as four 0.1 mil thick coats, exhibits: (i) a Strippability Level of at least 40% as measured by percent coating stripped from a tile after 300 cycles using a modified ASTM D-1792 procedure with a stripping solution consisting of 4 wt % monoethanolamine, 1 wt % diethyleneglycol butylether, 0.1% ethylenediamine tetracetic acid, 0.25 wt % $C_{9-11}$ alcohol ethoxylate, 2.6 wt % benzyl alcohol, and 92.05 wt % water, and (ii) an Ethanol Resistance of at least 60 percent, as measured by a 60° Gloss Retention Test re upon exposure to 0.33 milliliter/in² of a blend of 67.5 wt % ethanol 32.5 wt % water for a period of 60 minutes at 72° F. and relative humidity of 50%, wherein:

$R_{Et}$=%60° Gloss Retention$_{Et}$=100%−[(60° GU@$T_o$−60° GU@$T_{Et}$)/60° GU@$T_o$]×100%.

In an embodiment, the alkali soluble resin comprises at least one member selected from the group consisting of acrylic-acrylic acid resin, styrene-acrylic acid resin, styrene-α-methyl styrene-acrylic acid resin, styrene-acrylic-acrylic acid resin, styrene-α-methyl styrene-acrylic-acrylic acid resin, acrylic-methacrylic acid resin, styrene-methacrylic acid resin, styrene-methyl styrene-methacrylic acid resin, styrene-acrylic-methacrylic acid resin, styrene-α-methyl styrene-acrylic-methacrylic acid resin, styrene-maleic anhydride resin, and polycarboxypolyamide resin.

In an embodiment, the amine functional compound comprises at least one member selected from the group consisting of primary amine and secondary amine.

In an embodiment, the amine functional compound comprises at least one member selected from the group consisting of amine-containing polyester, amine-containing polyacrylate, amine-containing polycarbonate, amine-containing polyurea, amine-containing polybutadiene, amine-containing polyether, amine-containing polyamide, and amine-containing polysiloxane.

In an embodiment, the coating composition further comprises a wax. In an embodiment, the wax comprises at least one member selected from the group consisting of polyethylene wax and polypropylene wax. In an embodiment, the coating composition comprises the wax in an amount of from 5 wt % to 15 wt %, based on coating weight.

In an embodiment, the coating composition further comprises a coalescing agent comprising at least one member selected from the group consisting of an organic solvent and a plasticizer. In an embodiment, the organic solvent comprises at least one member selected from the group consisting of ethylene glycol, propylene glycol, ethylene glycol ether, pyrrolidone. Suitable plasticizers include at least one member selected from the group consisting of phosphate ester solvent, dibenzoate solvent, monobenzoate solvent, and phthalate solvent. In an embodiment, the coalescing agent is present in the coating composition in an amount of from 2 wt % to 15 wt %, based on coating composition weight.

In an embodiment, the coating composition further comprises at least one member selected from the group consisting of a defoamer and a leveling agent.

In an embodiment, the coating composition comprises, based on the weight of the coating composition: (i) the crosslinkable polymer in an amount of from 1 wt % to 50 wt %; (ii) the crosslinker in an amount of from 1 wt % to 10 wt %; (iii) the alkali soluble resin in an amount of from 0.1 wt % to 3 wt %; and (iv) the amine functional compound in an amount of from 0.02 wt % to 1.6 wt %.

In an embodiment, the coating composition comprises, based on the weight of the coating composition: (i) the crosslinkable polymer in an amount of from 8 wt % to 30 wt %; (ii) the crosslinker in an amount of from 1.5 wt % to 6 wt %; (iii) the alkali soluble resin in an amount of from 0.25 wt % to 2 wt %, and (iv) the amine functional compound in an amount of from 0.05 wt % to 0.8 wt %.

In an embodiment, the coating composition comprises, based on the weight of the coating composition: (i) the crosslinkable polymer in an amount of from 9 wt % to 20 wt %, (ii) the crosslinker in an amount of from 2 wt % to 4 wt %, (iii) the alkali soluble resin in an amount of from 0.5 wt % to 1.5 wt %, and (iv) the amine functional compound in an amount of from 0.1 wt % to 0.4 wt %.

In an embodiment, the alkali soluble resin has a weight average molecular weight of from 500 to 10,000 and an acid number of at least 100.

In an embodiment, the alkali soluble resin has a weight average molecular weight of from 1,000 to 3,000 and an acid number of from 140 to 400, and the alkali soluble resin is not a blocking agent.

BRIEF DESCRIPTION OF THE DRAWINGS

FIG. 3 is a perspective view of a secondary pouch which is inside the package illustrated in FIGS. 1 and 2.

FIG. 5 is a side view of the package illustrated in FIG. 2, taken from the right side of the package illustrated in FIG. 2, as noted by the 5-5 view in FIG. 2.

FIG. 6 is a longitudinal cross-sectional view of the package illustrated in FIG. 1, taken through section 6-6 of FIG. 1.

DETAILED DESCRIPTION

Figure 1:
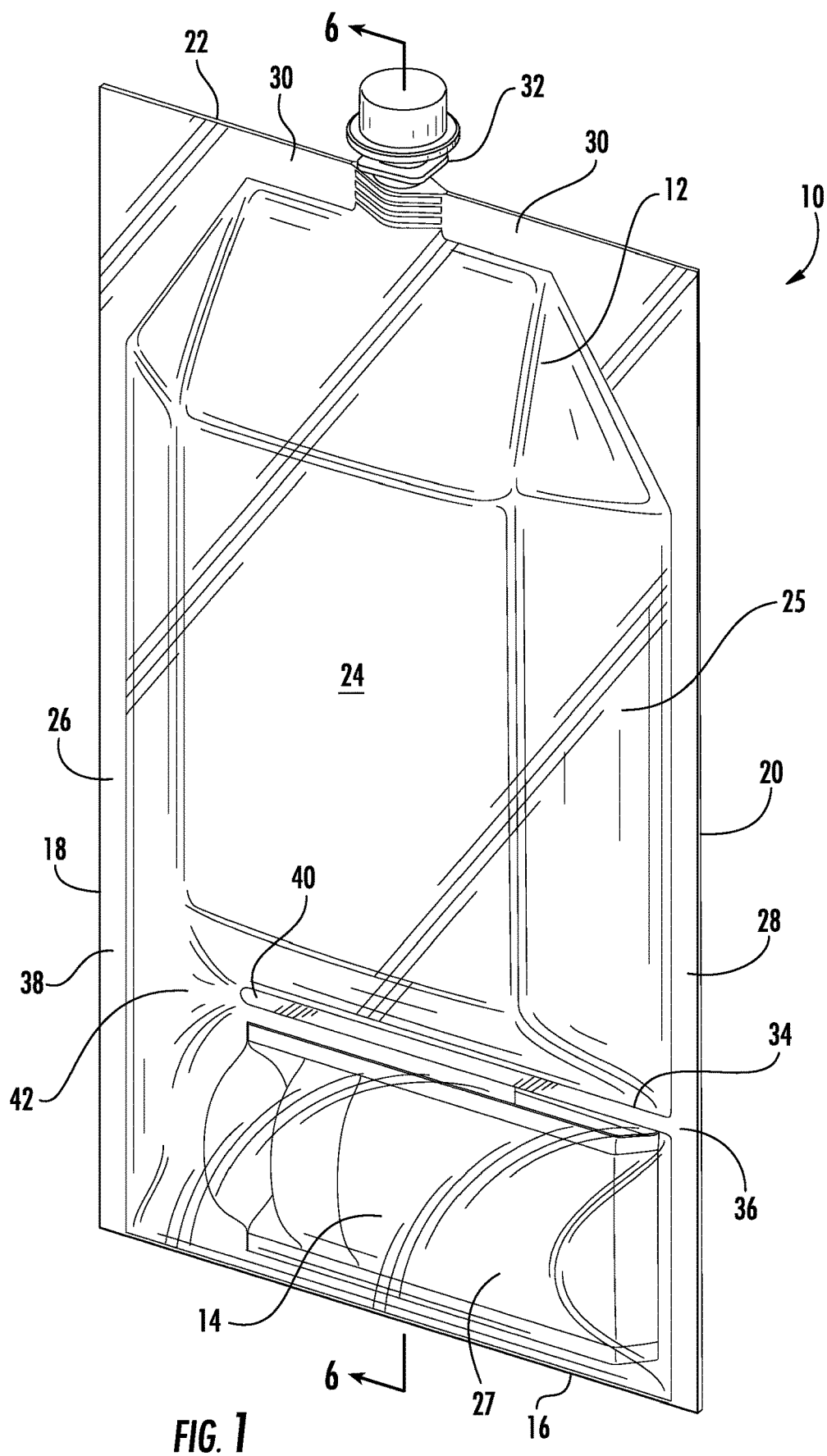
FIG. 1 is a perspective view of an embodiment of a multi-functional, two-pouch package containing two reactive components.

As used herein, the term "coating" refers to the cured coating on a flooring substrate, i.e., the coating containing only the solids, i.e., the non-volatiles. The volatiles in the coating composition, which composition was applied to the floor as a liquid, have evaporated during the process of drying and curing of the coating.

As used herein, the phrase "coating composition" refers to the combination of ingredients combined to make a formulation which is applied to the floor, which cures to form the coating. The coating composition comprises the solids (i.e., non-volatiles) as well as the volatiles which can include one or more of water, organic solvent, and any additional components which vaporize during the drying and curing of the coating.

As used herein, the phrase "initial gloss" refers to the 60° gloss level, in Gloss Units, of a floor coating after the coating has been cured but before the coating has been buffed. Gloss Units can be measured using a commercially available meter, such as are available from BYK Gardner and Elcometer. Gloss can be measured in accordance with ASTM D2457-13, which is hereby incorporated, in its entirety, by reference thereto.

As used herein, the phrase "buffed gloss" refers to the 60° gloss level, in Gloss Units, taken of a floor coating after it has cured and buffed by making 6 passes over the coating with a UHS Whirlmatic Burnisher at 1500 RPM with a TASKI INTELLIPAD burnishing pad from Diversey. Gloss is measured as described herein.

As used herein, the phrase "hybrid polymer" refers to a polymer composition having microphase separated domains of, for example, acrylic polymer and/or vinyl polymer dispersed within a continuous polyurethane matrix phase. Hybrid polymers are prepared by the polymerization of monomers to make the secondary polymer in the presence of a polyurethane emulsion.

The crosslinkable polymer in the coating composition, and the crosslinked polymer in the coating, can be a polyurethane, an acrylic polymer, and/or a polyurea. The crosslinked polymer provides the coating with durability and ethanol-resistance, and is also chemically strippable.

In an embodiment, the crosslinked polymer comprises a crosslinked polyurethane which is ethanol-resistant while being chemically-strippable. In the coating composition, the polyurethane may be applied to the flooring substrate as a polyurethane emulsion, polyurethane suspension, or polyurethane solution.

The coating composition may comprise at least one polyurethane which has been formed from the reaction of a diisocyanate and a diol. As used herein, the terms "diisocyanate" and "diol" refer to respective compounds having two or more isocyanate and alcohol functionalities thereon, including polyisocyanate and polyol. As used herein, the term "diisocyanate" includes compounds having two or more isocyanate functionalities thereon, including compounds which are oligomeric and/or polymeric and which have many isocyanate functionalities thereon. As used herein, the term "diol" includes compounds having two or more hydroxyl functionalities thereon, including compounds which are oligomeric and/or polymeric and which have many hydroxyl functionalities thereon.

The diisocyanate used in the preparation of the polyurethane may be, for example, an aliphatic diisocyanate such as isophorone diisocyanate, hexamethylene diisocyanate, etc., and/or an aromatic diisocyanate such as toluene diisocyanate, diphenylmethane diisocyanate, etc, and/or one or more oligomeric and/or polymeric diisocyanates of the diisocyanate reactants above. The diol may be, for example, a diol-containing ester, a diol-containing acrylate, a diol-containing carbonate, a diol-containing a urea, a diol-containing a butadiene, a diol-containing an ether, and a diol-containing amide, etc, and/or one or more oligomeric and/or polymeric diols of the diols-containing reactants above.

Commercially available polyurethanes include (a) HYBRIDUR® 870 and 878 NMP-free, anionically stabilized urethane-acrylic hybrid polymer dispersion, from Air Products and Chemicals, Inc, (b) HYBRIDUR® 570 and 580 urethane-acrylic hybrid polymer dispersion, from Air Products and Chemicals, Inc, (c) NEOREZ® water-based polyurethane resins from DSM, (d) NEOPAC® water-based hybrid urethane/acrylic hybrid resins from DSM, (e) PICASSIAN® PU-635 aqueous aliphatic polyester urethane hybrid polymer dispersion, from Stahl, (f) PICASSIAN® PU-648 aqueous, solvent free aliphatic polyether urethane hybrid polymer dispersion, from Stahl, (g) RELCA® PU-406 aqueous, NMP free aliphatic polycarbonate urethane hybrid polymer dispersion, from Stahl, (h) RELCA® PU-968 aqueous, NMP free aliphatic polyester urethane hybrid polymer dispersion, from Stahl, (i) UROTUF® polyurethane and aliphatic urethane polymer dispersions, from Reichhold, (j) UNITHANE® waterbased polyurethane dispersions, from Union Specialties Inc.

In an embodiment, the coating composition can comprise at least one member selected from polyurethane/acrylic hybrid and uv-curable polyurethane.

The amount of crosslinked polyurethane present in the coating is the sum of the polyurethanes in the coating plus the amount of crosslinker. In an embodiment, the crosslinked polyurethane can be present in the coating in an amount of from 30 wt % to 98 wt %, based on coating weight. In an embodiment, the crosslinked polyurethane is present in the coating in an amount of from 50 wt % to 98 wt %, or from 60 wt % to 95 wt %, or from 70 wt % to 92 wt %, or from 75 wt % to 90 wt %, or from 80 wt % to 90 wt %, based on coating weight.

In contrast, the polyurethane (i.e., total polyurethane, if more than one is present) makes up a much smaller relative amount of the coating composition. In an embodiment of the coating composition, the polyurethane can be present in an amount of from 1 wt % to 50 wt %, or from 5 wt % to 40 wt %, or from 8 wt % to 30 wt %, or from 9 wt % to 20 wt %, or from 10 wt % to 15 wt %.

The coating composition contains a crosslinker so that upon application of the coating composition to a flooring substrate, the polyurethane in the composition crosslinks to form a crosslinked polymer network. The polyurethane contains a plurality of sites (i.e., polyfunctional sites) which are crosslinkable with n corresponding crosslinker which is reactive with the plurality of sites. Suitable crosslinkers for use in the composition include polyfunctional compounds wherein the polyfunctionality comprises at least one of the following functional groups: carbodiimide, glycidyl epoxide, acetoacetoxy, diacetone, alkoxysilane, amine, hydroxyl, isocyanate, aziridine, hydrazide, and epoxide.

Commercially available carbodiimide crosslinkers include PICASSIAN® XL-701, XL-702, XL-725, and XL-732, from Stahl; carbodiimide crosslinkers XL-1V and CX-300® from DSM Coating Resins; carbodiimide crosslinkers CARBODILITE® V-02, V-04, E-02, and SV-02 from GSI Exim America, and carbodiimide crosslinker UCARLINK® XL-29SE from Union Carbide Corporation.

Commercially available aziridine crosslinkers include aziridine crosslinker CX-100® from DSM Coating Resins, and aziridine crosslinker CORIAL® Hardener from BASF.

Commercially available isocyanate crosslinkers include BASONAT® HW 1000, BASONAT HW® 2000, and BASONAT HW® 3000 from BASF, ASTACIN® Hardener Cl isocyanate crosslinker from BASF, ISONATE® isocyanate crosslinker and PAPI® isocyanate crosslinker from The Dow Chemical Company, PICASSIAN® XL-728 from Stahl, RHODOCOAT® EZ-M502 (polyisocyanate from Rhodia). These crosslinkers are suitable for crosslinking, for example, a polyurethane polyol, such as Henkel SF 5000 (NMP free version of QWF 4744, from Henkel).

In an embodiment, the crosslinker content in the coating composition can be from about 0.5 wt % to 20 wt %, or from 1 wt % to 10 wt %, or from 1.5 wt % to 6 wt %, or from 2 wt % to 4 wt %, or from 2.5 wt % to 3 wt %, based on coating composition weight. In the coating, the crosslinker is assimilated into the crosslinked polymer network; hence, in the coating, the weight of the crosslinker is included in the weight of the crosslinked polymer.

As used herein, the phrase "alkali soluble resin," also designated "ASR," refers to a type of resin which, when present in the coating composition at a level of 5 wt %, provides the coating with enhanced strippability while at the same time not serving as a matting agent. The ASR is different from "alkali soluble emulsions" such as ACRYSOL® resins products from The Dow Chemical Company, and LATEKOLL® D, available from BASF, and hydrophobically modified alkali soluble emulsions, all of which, when used at a level of from 0.1% to 10%, are disclosed as matting agents in paragraph 0023 of US 2012/0201963 A1. Whereas the presence of LATEKOLL® D alkali soluble emulsion in the coating composition imparts to the coating a resistance to increased gloss characteristics even after repeated burnishing and/or polishing, the presence of the 5 wt % alkali soluble resin in the coating composition of the invention does not impart to the coating a resistance to increased gloss characteristics even after repeated burnishing and/or polishing.

In general, the ASR present in the coating composition of the present invention has a lower weight average molecular weight than an alkali soluble emulsion. The ASR can have a weight average molecular weight ("$MW_w$") of less than 20,000, or less than 15,000, or less than 10,000, or less than 5,000, or less than 4,000, or less than 3,000, or less than 2,000, including resins with a $MW_w$ of from 500 to 20,000, or 600 to 10,000, or 800 to 5,000, or 1,000 to 4,000, or 1,200 to 3,000, or 1,500 to 2,000.

In general, the ASR has a higher acid number than the acid number of an alkali soluble emulsion. As used herein, the term "acid number" refers to the amount of KOH required to fully neutralize a given dry sample of substance, resin, polymer, or wax and is defined as milligrams ("mg") of KOH/dry gram of substance.

The ASR can have an acid number of ≥100, or ≥150, or ≥180, or ≥200, or ≥210, or ≥220, or ≥230. The ASR can have an acid number of from 100 to 1000, or from 120 to 500, or from 140 to 400, or from 160 to 350, or from 180 to 300, or from 200 to 280, or from 220 to 260, or from 230 to 250.

Commercially available alkali-soluble resins for use in the composition and the resulting coating include: (a) JONCRYL® B-98 ASR styrene-acrylic acid alkali soluble resin, a 28% dry weight styrene-acrylic acid resin ammonium salt aqueous solution from BASF, Wyandotte, Mich., (b) ASR B-33 styrene-acrylic acid alkali soluble resin, a 19.6% dry weight styrene-acrylic acid resin ammonium salt aqueous solution, available from Sealed Air (Diversey Care Division), Sturtevant, Wis., and (c) modified JONCRYL® 50 alkali soluble resin, a low VOC solution of JONCRYL® 682, a very low molecular weight acrylic resin having excellent clarity, high gloss and holdout, and low VOC, also from BASF. JONCRYL® 50 resin is an acrylic resin in water having a non-volatile content of from 49.5 wt % to 51.5 wt %, and having a weight average molecular weight of 1,700, an Acid Number of 238, a pH of 8.4, and a Brookfield viscosity at 25° C. of 5,000 cps.

In various examples below, JONCRYL® 50 resin is used in a modified form. As used below, "Modified JONCRYL® 50 resin" was prepared by combining: (i) 56.87 parts by weight water, (ii) 36.70 parts by weight JONCRYL® 50 resin (50 wt % solids in water), (iii) 1.29 parts by weight zinc oxide powder, (iv) 4.11 parts by weight KP-140 tributoxyethyl phosphate plasticizer, and (v) 1.03 parts by weight ammonium hydroxide (solubilize the zinc oxide). The modified JONCRYL® 50 resin was prepared by addition of the ZnO KP-140 with agitation to the JONCRYL® 50, heated to 55° C. followed by the slow addition of the ammonium hydroxide, stirring for 1 hour at 55° C., and thereafter cooled to room temperature The alkali soluble resin serves at least two purposes. First, the ASR enhances crosslinking of the polyurethane via inorganic crosslinking in addition to the organic crosslinking produced by the crosslinker described above. Second, the ASR enhances the strippability of the floor coating by enhancing the ability of the stripping composition to swell, resolubilize, and re-emulsify the cured alcohol-resistant floor coating.

Suitable alkali soluble resins for use in the composition include, for example, polymers that include a polymerizable organic acid moiety such as, without limitation, acrylic acid ("AA"), methacrylic acid ("MAA"), or maleic anhydride. Suitable alkali soluble or dispersible resins may include, but are not limited to, acrylic-acrylic acid resins, styrene-acrylic acid resins, styrene-α-methyl styrene-acrylic acid resins, styrene-acrylic-acrylic acid resins, styrene-α-methyl styreneacrylic-α-acrylic acid resins, acrylic-methacrylic acid, styrene-methacrylic acid resins, styrene-α-methyl styrene-methacrylic acid resins, styrene-acrylic-methacrylic acid resins, styrene-α-methyl styrene-acrylic-methacrylic acid resins, such as those described in U.S. Pat. No. 4,529,787, styrene-maleic anhydride resins, and polycarboxypolyamide resins as described in U.S. Pat. No. 6,518,334.

In an embodiment, the alkali soluble resin is present in the coating in an amount of from 1 wt % to 25 wt %, based on coating weight. In an embodiment, the alkali soluble resin is present in the coating in an amount of from 1 wt % to 20 wt %, or from 1 wt % to 15 wt %, or from 2 wt % to 12 wt %, or from 3 wt % to 10 wt %, or from 3 wt % to 7 wt %, or from 5 wt % to 7 wt %, or from 1 wt % to 6 wt %, or from 2 wt % to 5 wt %, or from 3 wt % to 5 wt %, based on coating weight.

In the coating composition, the alkali soluble resin solids can be present in an amount of from about 0.1 wt % to 3 wt %, or from 0.25 wt % to 2 wt %, or from 0.5 wt % to 1.5 wt %, based on coating composition weight.

In the floor coating composition, amine functional compound(s) serve to aid in the removal of the coating, by increasing the strippability of the coating. The presence of the amine functional compound can also enhance the ethanol resistance of the coating.

Suitable amine functional compounds for use in the composition include primary amines and secondary amines. More particularly, suitable amine-functional compounds include amine-containing polyester, amine-containing polyacrylate, amine-containing polycarbonate, amine-containing polyurea, amine-containing polybutadiene, amine-containing polyether, amine-containing polyamide, and amine-containing polysiloxane. Commercially available amine functional compounds include Wacker Silicone HC-130, SILRES® BS 4004, SILRES® BS 1360, and SILRES® BS 1306.

In an embodiment, the amine functional compound is present in an amount of from 0.1 wt % to 10 wt %, based on coating weight. In an embodiment, the amine functional compound is present in an amount of from 0.3 wt % to 9 wt %, or from 0.5 wt % to 8 wt %, or from 0.7 wt % to 7 wt %, or from 1 wt % to 7 wt %, or from 1 wt % to 5 wt %, or from 1.5 wt % to 4.5 wt %, or from 2 wt % to 4 wt %, or from 2.5 wt % to 3.5 wt %, based on coating weight.

In the coating composition, the amine functional compound solids can be present in an amount of from 0.2 wt % to 1.6 wt %, or from 0.05 wt % to 0.8 wt %, or from 0.1 wt % to 0.4 wt %.

As the polyurethane, acrylic polymer, and/or polyurea can be present in the coating composition as an aqueous dispersion, an aqueous emulsion, and/or an aqueous solution, the coating composition comprises water. In an embodiment, water can be present in the coating composition in an amount of from 30 wt % to 95 wt %, based on total weight of coating composition, i.e., the combined weight of all components to be mixed together to result in the coating composition applied to the flooring substrate. In an embodiment, water can be present in the coating composition in an amount of from 40 wt % to 95 wt %, or from 50 wt % to 90 wt %, or from 60 wt % to 85 wt %, or from 70 wt % to 80 wt %. The water evaporates as the coating composition cures to form the coating.

In a two-component coating composition in which the first component comprises an aqueous dispersion of a polyurethane and the second component comprises a carbodiimide crosslinker, both components may comprise water.

In contrast, in a two-component coating composition in which the first component comprises an aqueous dispersion of a polyol, and the second component comprises a polyisocyanate crosslinker, only the first component may comprise water. The polyisocyanate crosslinker is highly sensitive to the presence of water and must be protected even from atmospheric moisture in order to provide the packaged coating composition with adequate shelf life.

In an embodiment, the floor coating composition optionally comprises a coalescing agent. The coalescing agent may be an organic solvent and/or a plasticizer. The coalescing agent serves to provide the composition with film forming properties. Upon the application of the coating composition to a flooring substrate, the coalescing agent evaporates as the coating composition cures to form the coating.

Suitable organic solvents for use in the composition include organic solvents that are totally or partially soluble in water as well as organic solvents that are insoluble in water. Organic solvent coalescing agents can include, but are not limited to, glycol ethers including ethylene glycol, propylene glycol, ethylene glycol 2-ethylhexyl ether, ethylene glycol phenyl ether, diethylene glycol methyl ether, diethylene glycol ethyl ether, diethylene glycol propyl ether, diethylene glycol butyl ether, diethylene glycol 2-ethylhexyl ether, propylene glycol phenyl ether, dipropylene glycol methyl ether, dipropylene glycol propyl ether, and dipropylene glycol n-butyl ether; pyrrolidone solvents including, but not limited to, 2-pyrrolidone, N-methyl-2-pyrrolidone, N-ethyl-2-pyrrolidone, N-octyl-2-pyrrolidone, N-dodecyl-2-pyrrolidone, N-(2-hydroxyethyl)-2-pyrrolidone, N-cyclohexyl-2-pyrrolidone, and combinations thereof.

Suitable plasticizers include phosphate ester solvents including, but not limited to, tributoxyethyl phosphate, triethyl phosphate, triethoxyethyl phosphate, tributyl phosphate, triphenyl phosphate, and tricresyl phosphate; dibenzoate solvents including, but not limited to, propylene glycol dibenzoate, dipropylene glycol dibenzoate, polypropylene glycol dibenzoate, ethylene glycol dibenzoate, diethylene glycol dibenzoate, polyethylene glycol dibenzoate, and neopentyl glycol dibenzoate; monobenzoate solvents including, but not limited to, isodecyl benzoate, and dipropylene glycol methyl ether benzoate; phthalate solvents including, but not limited to, diethyl phthalate, dibutyl phthalate, butyl benzyl phthalate, and 2,2, 4-trimethyl-1, 3-pentanediol diisobutyrate, and combinations thereof.

In the floor coating composition, the coalescing agent may be present in either or both of the first component or the second component. The coalescing agent may be present in the coating composition in an amount of from 0 wt % to 20 wt %, based on coating composition weight. In an embodiment, the coalescing agent may be present in the coating composition in an amount of from 2 wt % to 15 wt %, or from 5 wt % to 10 wt %, or from 6.5 wt % to 8.5 wt %, or from 7 wt % to 8 wt %, or from 7.4 wt % to 7.9 wt %, based on coating composition weight. If the coating composition has a low level of coalescing agent, it may be VOC-compliant and/or VOC-free.

The coating composition and the resulting coating may optionally comprise a wax. The wax serves to increase gloss, enhance the ability to burnish the coating, and increase the scuff resistance of the coating. Alternatively, the coating composition may be wax-free. In a two-component coating composition, the wax may be present in either or both components.

Optional wax materials that may be included in the coating composition include plant, animal and petroleum derived waxes that are present as an emulsion in the coating composition. Suitable waxes include, for example, plant (e.g. vegetable), animal, insect, synthetic, and/or mineral waxes. More particularly, suitable waxes include, but are not limited to, candelilla wax, Fisher-Tropsch wax, oxidized petroleum wax such as oxidized polyethylenes, oxidized polypropylenes, microcrystalline wax, lanolin wax, wax derived from cocoa butter, carnauba, cottonseed wax, stearin wax, Japan wax, bayberry wax, myrtle wax, wax derived from mace, palm kernel wax, beeswax, spermaceti, Chinese insect wax, wax made from mutton tallow, polyethylene wax, polypropylene wax, waxes based on copolymers of propylene and acrylic acid and/or methacrylic acid, wax based on copolymers of ethylene and acrylic acid and/or methacrylic acid, wax based on copolymers of ethylene and acrylic acid and/or methacrylic acid and/or maleic anhydride, wax based on copolymers of ethylene and styrene and/or other vinyl monomers, wax obtained from hydrogenation of coconut oil or soybean oil, mineral waxes such as paraffin, ceresin, montan, ozokerite, and maleated polypropylenes, and combinations thereof. In some embodiments, the wax emulsion may comprise a wax with an acid number greater than one.

Suitable petroleum waxes include polyethylene waxes, polypropylene waxes and combinations thereof. Suitable polyethylene waxes may be oxidized or co-polymerized with acrylic acid to give the polyethylene chemical functionality which allows it to be emulsified in the aqueous solution. Polyethylene materials that are free of functional groups may also be used. The polyethylene may be classified as high density polyethylene (HDPE) or low density polyethylene (LDPE). HDPE is higher melting (110° C. to 140° C./230° F. to 284° F.) and is harder. LDPE is lower melting (100° C. to 110° C./212° F. to 230° F.) and softer. The wax may also be classified as non-ionic, cationic or anionic.

In some embodiments, the wax emulsion concentration may be from 0 to 40 wt % on based on 100 parts by wt coating composition. In some embodiments, the amount of wax emulsion may be less than about 40 wt % or less than about 30 wt % or less than about 20 wt % on active wt % based on 100 parts of the first coating composition. In other embodiments, the amount of wax emulsion may be at least about 5 wt % or at least about 3 wt % on active wt % based on 100 parts of the first coating composition. This includes ranges of about 2 to about 40 wt % and about 10 to about 30 wt % on active wt % based on 100 parts of the first coating composition.

In an embodiment, the coating composition comprises the optional wax in an amount of from 0 wt % to 15 wt %, based on composition weight. In an embodiment, the coating composition comprises the optional wax in an amount of from 0.2 wt % to 10 wt %, or from 0.5 wt % to 5 wt %, or from 1 wt % to 3 wt %, or from 1.5 wt % to 2.5 wt %.

In an embodiment, the coating comprises wax in an amount of from 2 wt % to 20 wt %, of from 5 wt % to 15 wt %, or of from 7 wt % to 11 wt %, or about 8 wt % to 10 wt %, based on coating weight.

The first or second component may also optionally include various additional additives such as surfactants, defoamers, surface tension modifiers, leveling agents, air release agents, flattening agents, plasticizers, functional polymers, hydrophilicity/hydrophobicity enhancers, and preservatives. Examples of suitable commercially available surfactants include polyether siloxane surfactants such as TEGO FOAMEX® 805 available from Tego.

Suitable defoamers include SE-21® available from Wacker and BYK-024 from Altana. In an embodiment, the defoamer is present in an amount of from 0 wt % to 1 wt %, based on weight of coating composition. In an embodiment, the defoamer is present in an amount of from 0.0005 wt % to 0.5 wt %, or 0.001 wt % to 0.05 wt %, or 0.005 wt % to 0.02 wt %, or 0.008 wt % to 0.012 wt %, based on weight of coating composition.

Suitable leveling agents include low molecular weight acrylic resins and urea resins. Suitable leveling agents include CAPSTONE FS-60 fluorosurfactant, from DuPont, BYK-345 silicone leveling aid, from Altana, and other similar compounds as known to those of skill in the art. In an embodiment, the leveling aid is present in an amount of from 0 wt % to 2 wt %, based on weight of coating composition. In an embodiment, the leveling aid is present in an amount of from 0.01 wt % to 1 wt %, or 0.02 wt % to 0.04 wt %, based on weight of coating composition.

In an embodiment, the coating composition optionally comprises zinc oxide, which serves as a crosslinking aid and as a hardness agent. In an embodiment, the zinc oxide is present in an amount of from 0 wt % to 2 wt %, based on weight of coating composition. In an embodiment, the leveling aid is present in an amount of from 0.02 wt % to 1 wt %, or 0.05 wt % to 0.1 wt %, or from 0.06 wt % to 0.08 wt %, based on weight of coating composition.

The alcohol-resistant chemically-strippable coating composition can be applied to a variety of flooring subdstrates such as of stone (including engineered stone), vinyl, marble, granite, terrazzo, concrete, glass, quartz, ceramic (including both glazed ceramic and unglazed ceramic), porcelain, glass, wood (including engineered wood), vinyl (including vinyl composition tile), linoleum, and rubber.

The coating material applied to the floor may dry to the touch in less than 60 minutes, more particularly, less than 45 minutes, and may be burnished to restore gloss.

The polyurethane coating composition may have a pot life, drying time, and viscosity that are better than conventional polyurethane coatings and/or are similar to acrylic finishes. For example, embodiments utilizing an aqueous polyurethane emulsion and a carbodiimide crosslinker may have a pot life of up to 5 days or up to 7 days or more and even up to 10 days or more. On the other hand, embodiments having a first component comprising an aqueous dispersion of a polyurethane and a polyisocyanate crosslinker may have a pot life of at least 3 hours, or at least 5 hours, or least 8 hours, or from 3 to 10 hours, or from 6 to 8 hours.

The coating composition can be applied with traditional acrylic floor finish application methods, such as string mop and flat mop applications. Moreover, the coating is responsive to burnishing processes to restore gloss after normal wear has occurred. Suitable burnishing treatments include mechanical and chemical treatments.

Coating Formulation No. 1

An alcohol-resistant, chemically-strippable coating composition was developed as a two-component composition in which the base coating composition utilized a first component which was a blend of two polyurethanes and the second component was a carbodiimide for crosslinking the polyurethane in the first component upon mixing the two components together. This coating composition is set forth in Table 1.

TABLE 1

| Ingredient | Tradename | wt % | wt % solids | solids parts by wt (in coating) | wt % solvent/ dispersant | wt % (in cured coating) |
|---|---|---|---|---|---|---|
| Water | — | 43.84 | 0 | 0 | 43.84 | 0 |
| Urethane-Acrylic Resin* | HYBRIDUR® 878 (Air Products) | 23.07 | 40 | 9.23 | 13.84 | 52.29 |
| Polyurethane | NeoRez® 1073 (DSM Coatings) | 8.04 | 35 | 2.81 | 5.23 | 15.92 |
| Diethyleneglycol Ethylether | (Dow) | 7.40 | 0 | 0 | 7.40 | 0 |
| Alkali Soluble Resin | Modified JONCRYLI® 50 Resin | 5.20 | 20 | 1.04 | 4.16 | 5.89 |
| amine functional compound | Wacker Silicone HC-130 | 1.11 | 20 | 0.22 | 0.89 | 1.25 |

TABLE 1-continued

| Ingredient | Tradename | wt % | wt % solids | solids parts by wt (in coating) | wt % solvent/ dispersant | wt % (in cured coating) |
|---|---|---|---|---|---|---|
| modified polyethylene wax emulsion | AC-316 wax emulsion | 3.53 | 35 | 1.24 | 2.29 | 7.03 |
| Modified polypropylene wax emulsion | E-43 wax emulsion | 0.88 | 35 | 0.31 | 0.57 | 1.76 |
| Leveling Aid | FS-60 (DuPont) | 0.03 | 100 | 0.03 | 0 | 0.17 |
| Defoamer | BYK-024 (Byk) | 0.01 | 100 | 0.01 | 0 | 0.06 |
| Carbodiimide Crosslinker | PICASSIAN ® XL-732 | 6.89 | 40 | 2.76 | 4.13 | 15.64 |
| TOTAL | — | 100 | — | 17.65 | 82.35 | 100 |

*In subsequent embodiments, the HYBRIDUR was filtered through a 10 micron filter, resulting in improvement in Strippability Level More particularly, the various ingredients set forth in Table 1 were as follows:

HYBRIDUR® 878 NMP-free, anionically stabilized urethane-acrylic hybrid polymer dispersion (40 wt % solids in water), obtained from Air Products and Chemicals, Inc, NEOREZ® 1073 aliphatic polyurethane water-based dispersion, 35% NV, obtained from DSM Coating Resins, Wilmington, Mass.

CARBITOL® DE, from The Dow Chemical Company, a diethylene glycol monoethyl ether, which can be obtained from multiple sources.

Modified JONCRYL® 50 alkali soluble resin (ASR) styrene-acrylic acid alkali soluble resin, a 28% dry weight styrene-acrylic acid resin ammonium salt aqueous solution from BASF, Wyandotte, Mich., WACKER® HC 130 silicone emulsion, 60% NV, obtained from Wacker Chemical Corp. of Adrian, Mich.

AC-316 wax emulsion (35% non-volatiles "NV", prepared from ingredients as described in Table 2, below, which is directed to wax emulsion compositions)

EPOLENE® E-43 wax emulsion (40% NV, prepared from ingredients as described in Table 2, below, for wax emulsion compositions), CAPSTONE® FS-60 wetting and leveling agent, 40% active fluorochemical, from DuPont, BYK®-024 polysiloxane defoamer, 96% NV, from BYK-Chemie USA of Wallingford, Conn.

PICASSIN® XL-732 multifunctional polycarbodiimide, 40% NV, obtained from Picassian Polymers of Peabody, Mass.

The modified wax emulsions were prepared in accordance with Table 2, below.

TABLE 2

Modified Wax Emulsion Compositions

| Ingredient | wt % solids | AC-316 modified Wax Emulsion | EPOLENE ® E-43 Modified Wax Emulsion |
|---|---|---|---|
| De-ionized Water | 0 | 64.358 | 57.384 |
| AC-316 Wax | 100 | 27.51 | 0.0 |
| EPOLENE ® E-43 Wax | 100 | 0.0 | 29.149 |
| TOMADOL ® 25-9 Surfactant | 100 | 6.8 | 8.712 |

TABLE 2-continued

Modified Wax Emulsion Compositions

| Ingredient | wt % solids | AC-316 modified Wax Emulsion | EPOLENE ® E-43 Modified Wax Emulsion |
|---|---|---|---|
| Caustic Potash (45%) | 45 | 0.874 | 4.755 |
| Sodium Bisulfite (38%) | 38 | 0.778 | 0.0 |
| Total Ingredients | — | 100.000 | 100.000 |
| % non-volatiles (% NV) | | 35.0% | 40.0% |

AC-316 Wax, oxidized high density polyethylene with an acid number of about 16, obtained from Honeywell International Inc., Morristown, NJ
EPOLENE ® E-43 wax, maleated polypropylene with an acid number of about 45, obtained from Westlake Chemical, Houston, TX.
TOMADOL ® 25-9 Surfactant, $C_{12-15}$ Ethoxylated Alcohol, obtained from Air Products & Chemicals, Allentown, PA.
Caustic Potash (45%), 45% KOH in water solution, obtained from Oxychem, Dallas, TX.
Sodium Bisulfite (38%), 38% Sodium Bisulfite in water solution, obtained from Hydrite Chemical, Milwaukee, WI.

Coating Composition No. 1 was used to form a coating on a vinyl composition tile, which was then assessed to determine the Strippability Level of the coating and the Ethanol Resistance of the coating. Coating Composition No. 1 was used to produce a coating having a Strippability Level of at least 51% and an Ethanol Resistance of at least 97%. The formation of the coating and the procedures for the testing were as described below.

The Modified ASTM D1792-82 Strippability Test Procedure

In general, the stripping test is carried out as described in ASTM D1792-82 (Reapproved 1997), which is hereby incorporated, in its entirety, by reference thereto. The ASTM test is modified where noted below. In instances in which no notice of a modification is disclosed hereinbelow, the parameters of ASTM D 1792-82 test are to be followed. Variables not set by ASTM D1792-82 are as provided below. In any instances in which the test description below may differ from ASTM D1792-82, the test description below controls. Unless otherwise noted, the test is carried out at room temperature (22° C.), 50% relative humidity, and 1 atmosphere pressure.

A 12"×12" black vinyl composition tile (e.g., black Armstrong FEATURE® brand vinyl composition tile), having a thickness of 3.2 millimeters (i.e., ⅛ inch), is stripped with an abrasive pad and stripper solution, rinsed thoroughly with water and allowed to dry at room temperature. After drying for at least 8 hours at room temperature, the tile is coated with 4 coats of the coating composition. Each coat is formed by the application of enough coating composition to result in a single coating thickness of 0.1 mil, based on the nonvolatile content of the coating composition and size of the tile section being coated.

The procedure for coating the tile with the composition was as follows. First, an applicator is prepared by twice folding a 1"×3" piece of dry cheesecloth to make a 3-layer 1"×1" dry cheesecloth pad. The coating composition is applied to the cheesecloth pad which was used as an applicator to apply the finish to the section of the tile. 45 Minutes drying time is allowed between coats. Each coat is made using new, unused applicator pad.

The dried four-layer coating on the 12"×12" tile is thereafter allowed to age for 4 days. Aging is carried out at room temperature (22° C.), 50% relative humidity, and 1 atmosphere pressure. Thereafter, the tile with coating thereon is cut up into six sample strips, each sample strip having a size of 2 inches by 12 inches. Three of the six sample strips from each tile are used for testing, with the remaining three samples being available for further testing if desired.

Figure 11:
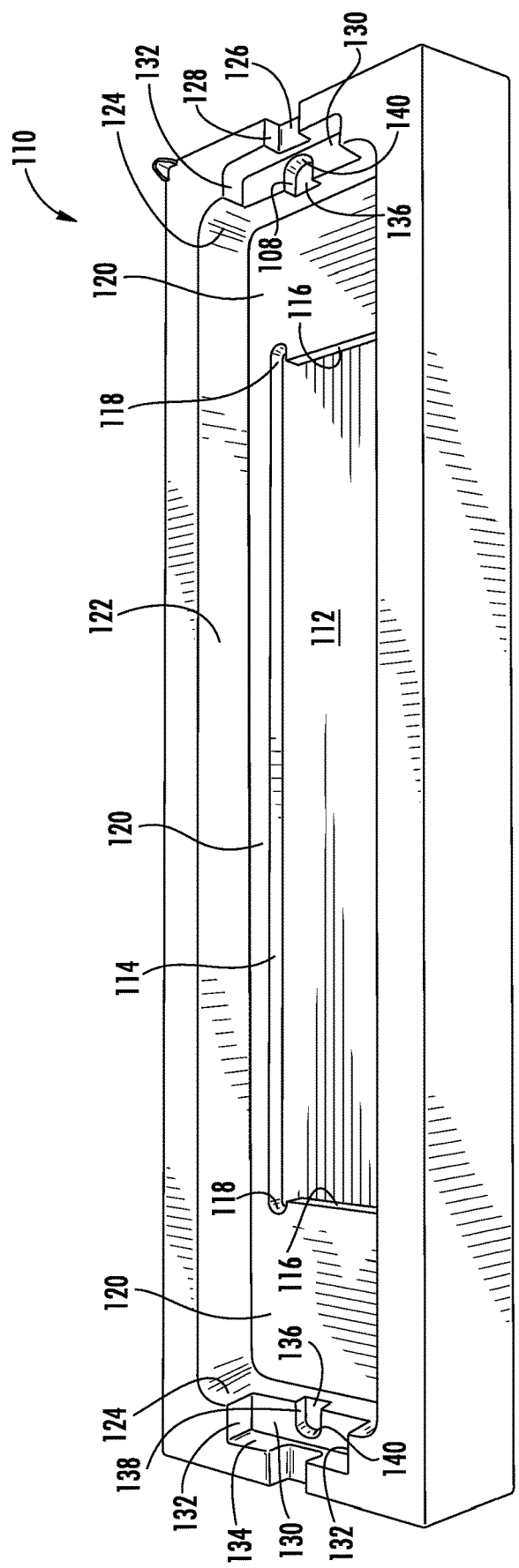
FIG. 11 illustrates a perspective view of this custom tile sample holder for use in the abrasion tester of FIG. 10.
Figure 12:
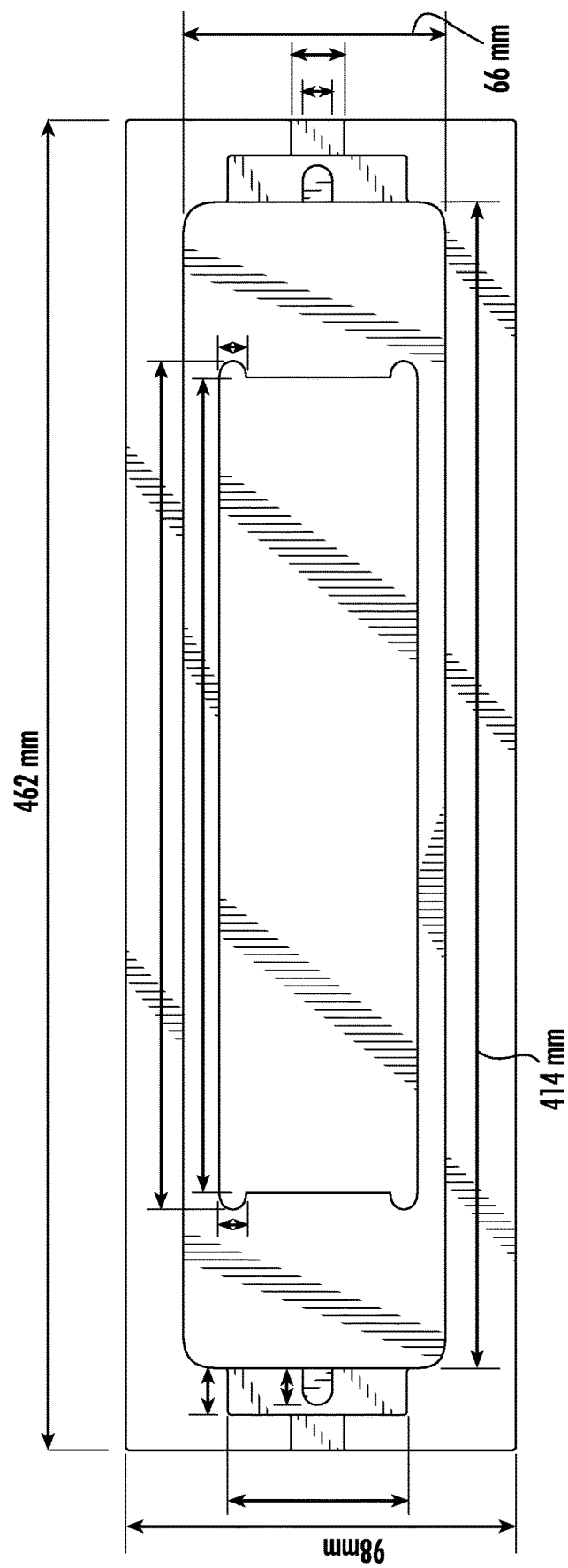
FIG. 12 illustrates a top view of sample holder of FIG. 11.
Figure 13:
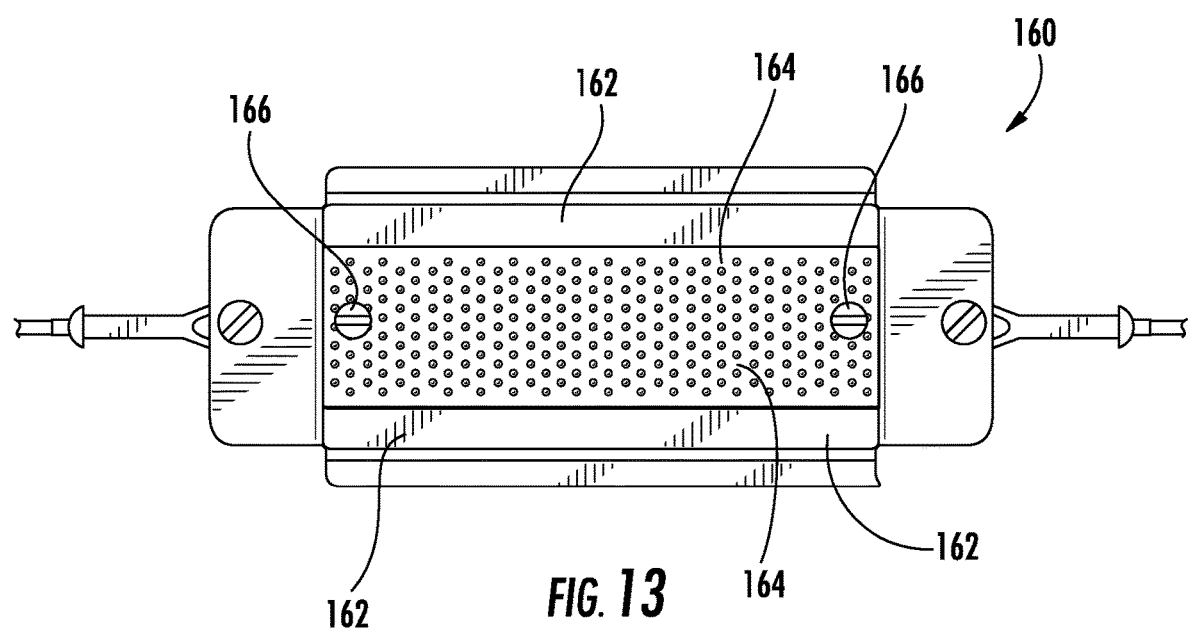
FIG. 13 is a bottom view of a customized "modified boat" part of the abrasion tester illustrated in FIG. 10.

In each test, a single 2"×12" sample strip is placed, coated side up, into the sample recess in a custom made tile sample holder to be used with a Byk-Gardner abrasion tester, Model AG-8100. FIG. 11 illustrates a perspective view of this custom tile sample holder, i.e, custom tile sample holder 110. FIG. 12 illustrates a top view of sample holder 110, and FIGS. 13, 14, and 15 illustrate various cross-sectional views of tile holder 110. Sample holder 110 has an overall length of 462 millimeters, an overall width of 98 millimeters, and an overall thickness of 32 millimeters.

In FIG. 11, sample holder 110 has a lower recess, which is the tile recess, formed by central bottom surface 112, lower side walls 114, and lower end walls 116. The lower recess has a depth of 5 millimeters, i.e., the height of lower side walls 114 and lower end walls 116. The lower recess has a length of 305 millimeters between lower end walls 116 and a width of 52 millimeters between lower side walls 114. At each of the four corners where lower side walls 114 meet lower end walls 116 is a notch 118 for ease in removing the tile sample.

In FIG. 11, an upper recess is formed by peripheral bottom surface 120, upper side walls 122 and upper end walls 124. The upper recess has a depth of 19 millimeters, i.e., the height of upper side walls 122 and upper end walls 124. The upper recess has a length of 414 millimeters between upper end walls 124 and a width of 66 millimeters between upper side walls 122.

A middle section of each of upper end walls 124 has three notches therein: (i) an uppermost central through notch which serves as a cable guide notch, with the through notch being formed by top step surface 126 and side surfaces 128; top step surface has a width of 12 millimeters between side surfaces 128, and a length of 10 millimeters; side surfaces 128 have a height of 5 millimeters and a length of 10 millimeters; (ii) an intermediate notch formed by middle step surface 130, middle step end surfaces 132, and middle step back surface 134; middle step surface has a width of 45 mm between middle step end surfaces 132, and a length of 13 millimeters; middle step end surfaces 132 have a length of 13 millimeters and a height of 7 millimeters; middle step back surface has a height of 7 millimeters and a width of 45 millimeters; and (iii) a lowermost notch formed by lowermost step surface 136, lowermost step side surfaces 138, and lowermost step back surface 140; lowermost step surface 136 has a width of 9 millimeters and a length of 10 millimeters; lowermost step side surfaces 138 have a length of 10 millimeters and a height of 3 millimeters; lowermost step back surface has a height of 3 millimeters and a width of 9 millimeters.

Figure 10:
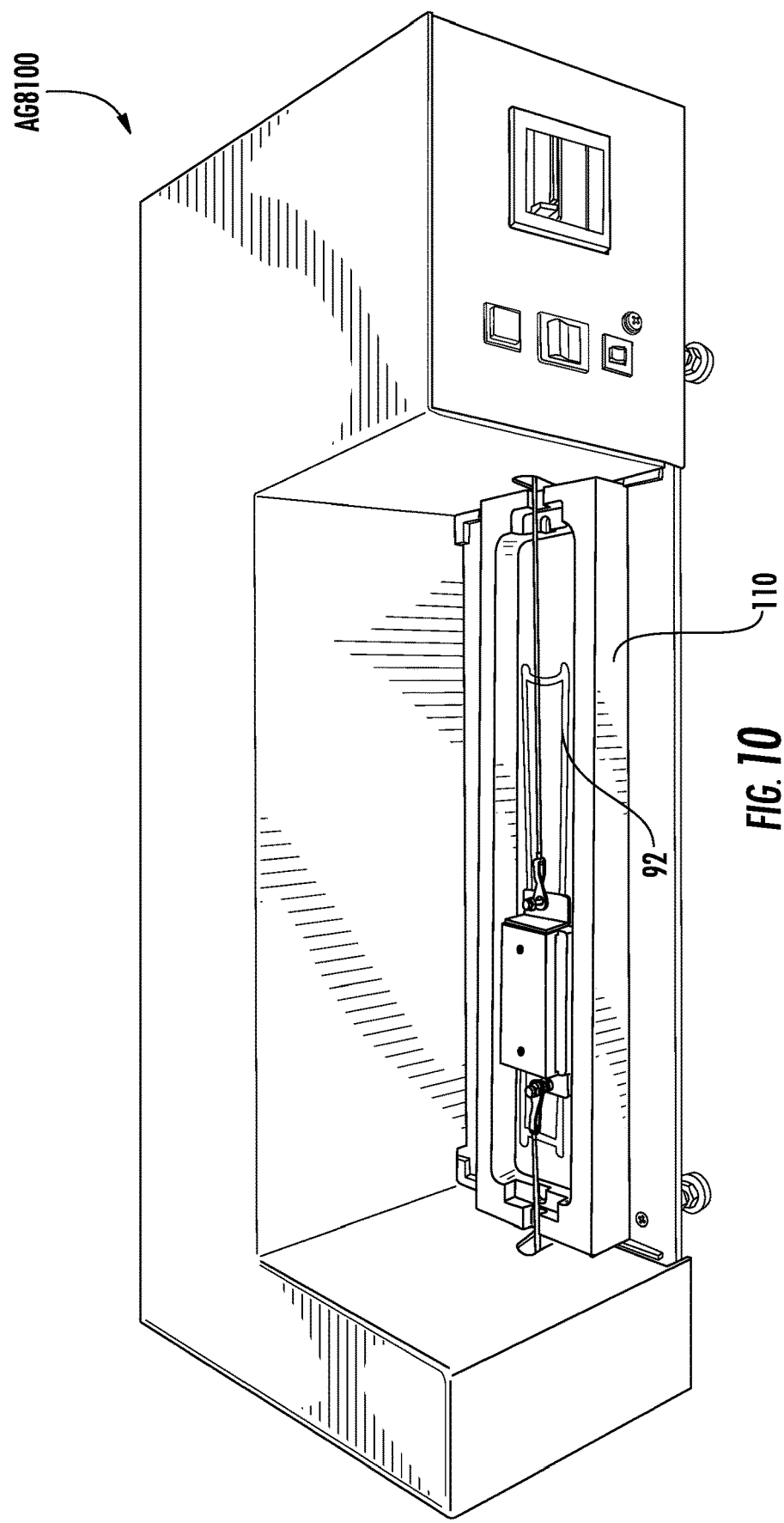
FIG. 10 is a perspective view of a Byk-Gardner abrasion tester, Model AG-8100.

Stripping is carried out by placing the tile sample, coated side up, into the lower recess of the custom tile sample holder 110, which is placed into the Byk-Gardner abrasion tester, Model AG-8100, as illustrated in FIG. 10. A customized "modified boat" 160, illustrated right-side-up in FIG. 10, is positioned to oscillate back and forth over sample 92 located in the lower recess of custom tile sample holder 110.

As illustrated in the bottom view of FIG. 13, customized "modified boat" 160 was prepared by modifying part number PB-8110 of Byk-Gardner tester Model AG-8100. Modification consisted of using epoxy glue to adhere plastic block 162 inside a cavity on the underside of part number PB-8110. FIG. 13 illustrates modified weight boat 160, including plastic block 162 glued into the cavity thereof, and with hook faster strip 164 fastened to the bottom face of plastic block 162 by a pair of plastic flat-head plastic screws 166. Plastic block 166 was 25 mm thick, 37 mm wide, and 88 mm long. Hook fastener strip 164 was 25 mm wide and 88 mm long and was the hook portion of a VELCRO® hook-and-loop fastener system. With the addition of glued plastic block 166, hook fastener strip 164, and plastic screws 166, the modified weight boat had a total weight of 448.5 grams.

A 2-inch wide, 4-inch long, 1-inch thick piece of abrasive pad was cut from a Scotch-Brite™ Red Buffer Pad 5100, obtained from 3M. Using the exposed hooks on hook fastener strip 164, the piece of red buffer pad was affixed to the bottom of the modified boat by the hooks on fastener strip 164.

Before starting the Byk-Gardner abrasion tester, 50 milliliters of stripping solution are prepared by combining: (i) 4 wt % monoethanolamine, (ii) 1 wt % diethyleneglycol butylether, (iii) 0.1% ethylenediamine tetracetic acid, (iv) 0.25 wt % alcohol ($C_{9-11}$) ethoxylate ("6EO"), (v) 2.6 wt % benzyl alcohol, (vi) 92.05 wt % water. The 50 milliliters of stripping solution are then poured into the upper recess of the custom tile sample holder, and over the sample strip positioned in the lower recess. The upper surface of the sample strip remains covered by the stripping solution while the sample strip remains in the custom tile holder.

Contrary to the 1-minute dwell time after addition of the stripping solution to the tile holder as called for by ASTM D 1792-82, the stripping test procedure utilizes no dwell time after the stripping solution is added to the tile holder containing the coated strip. The motor of the abrasion tester is then started, with the weighted boat having a 2 inch×4 inch piece of the 3M 5100 red pad abrading the coating by passing thereover for a total of 300 cycles. Each of the 300 cycles includes one pass over the sample strip and one pass back over the sample strip. Once the 300 cycles is completed, the sample strip is removed from the tile holder and rinsed with water and then pat dried with a paper towel and allowed to air dry for 15 minutes, i.e., until completely dry.

Upon completion of 300 cycles, the sample strip is then examined to determine the area of the sample strip which is completely stripped of coating, i.e., the area from which 100% of the coating is removed, i.e., with bare vinyl composition tile exposed. The amount of coating removed can be estimated qualitatively or quantitatively by human eye assessment, estimating the % of the area of the upper surface of the strip sample having coating remaining thereon. The percent stripped area is calculated by 100% minus % unstripped area. The percent stripped area is herein termed (and is therefore equal to) the "strippability level" of the coating, also referred to as the "% strippability."

Each strip is individually tested and individually analyzed. Any portion of the surface having any visible coating thereon is considered to be "unstripped area." The portions of the surface having visible coating thereon exhibited an irregular shape. Although processes are available for precisely quantifying the amount of strip having coating remaining thereon, an assessment of plus or minus 10% can be achieved by a visual examination and estimation carried out with the naked eye.

A more precise assessment can be carried out by any number of methods known to those of skill in the art, such as cutting the sample strip apart along the intersection of the areas having coating remaining and the areas having no coating remaining. Then the weight of the uncoated portions divided by the total weight of the sample strip before cutting, multiplied by 100, yields a quantitative determination of the percent stripped area.

Assessment of % Stripped Area Via Image Analysis: ImaqeJ Instructions

Assessment of % stripped area with image analysis utilized ImageJ software. See http://imaqei.nih.gov/ij/. Photographs were taken with a camera using a .TIFF file.

Photographs were taken in a miniature photography studio environment prepared using a LimoStudio 24" Table Top Photography Studio Light Tent Kit in a Box, with a Photo Tent, 2× Double Head Light Set, Mini Camera Stand, and two GU10 Light Bulbs (AGG903).

The setup for taking all photographs was consistent with respect to distance, light source, and camera device, and all pictures were taken at a 90° relative to the sample. After taking photographs, the desired image file was selected and downloaded from the camera. In order to crop the photo, the Image J program was opened, then proceeding to File»Open, and the desired image file was selected and downloaded from the camera. Using the selection icons, an area was selected to crop for performance of an image analysis thereon. The file was named and saved as a .TIFF file.

In order to conduct the image analysis, the newly-made file in Image J was opened, as before. After proceeding on to Analyze»Set Measurements, when the Set Measurements tab box opened up, each of the following boxes were checked: Area, Mean Gray Value, Min & Max Gray Value, Area Fraction, and Display label. The image was then converted into an 8-bit file Image, i.e., Type 8-bit.

After the image has been converted to 8-bit, the threshold was set by Image»Adjust»Threshold. The image was then transformed into black and white by: Auto adjusting the image, setting the right bar to "Default", switching the right drop down box from "Red" to "B&W", selecting the box "Dark background" (don't select "stack Histogram"), clicking auto, apply, and exiting out the tab.

Once the image was converted, the picture were analyzed by the software Analyze»Analyze Particles. A box came up, and the following boxes were checked: Clear Results, Summarize, and Include Holes. Okay was hit and a results box came up. The percent area data was recorded.

Ethanol Resistance Test (60° Gloss Retention Test)

The degree of resistance a coating offers to ethanol is measured by a custom test described hereinbelow. This test is not an ASTM test. It is a 60° Gloss Retention Test after exposure to 0.33 milliliter/in² of a blend of 67.5% ethanol 32.5% water for a period of 60 minutes at 72° F. and relative humidity of 50%. In the Ethanol Resistance Test:

$$R_{Et} = \%60° \text{ Gloss Retention}_{Et} = 100\% - [(60° \text{ GU}@T_o - 60° \text{ GU}@T_{Et})/60° \text{ GU}@T_o] \times 100\%,$$

where "$R_{Et}$" represents Ethanol Resistance in percent; "% 60° Gloss Retention$_{Et}$" is the percent of 60° gloss retention after exposure to the blend of 67.5% ethanol 32.5% water for a period of 60 minutes at 72° F. and relative humidity of 50%; "GU" represents gloss units; $T_o$ represents the start time for the test, and $T_{Et}$ is 60 minutes after $T_o$.

The Ethanol Resistance Test is carried out using 12"×12" black vinyl composition tile (e.g., black Armstrong FEATURE® vinyl composition tile). The tile is completely stripped using an abrasive pad and stripper solution. The stripped tile is then rinsed with water and allowed to dry at room temperature for 8 hours.

The 12"×12" stripped black vinyl composition tile is then coated with 4 coats of a coating composition to be tested for ethanol resistance. The coating of the coating composition on the stripped black vinyl composition tile is carried out at room temperature (22° C.), 50% relative humidity, and 1 atmosphere pressure. Each coat is formed by the application of enough coating composition to result in a single coating thickness of 0.1 mils, based on the non-volatile content of the coating composition.

The procedure for coating the tile with the composition is as follows. First, an applicator is prepared by twice folding a 1"×3" piece of dry cheesecloth to make a 3-layer 1"×1" dry cheesecloth pad. The coating composition is applied to the cheesecloth pad which is used as an applicator to apply the finish to the tile. 60 Minutes drying time is allowed between coats. Each coat is made using a new, unused applicator pad. After application of the fourth coat, the resulting coating is allowed to cure for 24 hours before testing, at room temperature (22° C.), 50% relative humidity, and 1 atmosphere pressure.

After curing, a wax pencil is used to draw three test area circles on the cured coating. Each test area circle has an inside diameter of 2.25 inches, with the line from the wax pencil being about 3 to 5 millimeters wide. A single 60° gloss measurement is taken on the coating inside each of the three test circles, using an ELCOMETER®408 gloss meter. The values obtained are 60° gloss units at $T_o$ (i.e., 60° GU @ $T_o$). $T_o$ represents time before exposure to the ethanol solution.

An ethanol-water blend (67.5 wt % ethanol, 32.5 wt % water) is prepared. One milliliter of the ethanol-water blend is applied over the cured coating inside each of the three test circles. The ethanol-water blend represents a chemical composition similar to a hand sanitizer. The ethanol-water blend is applied in a plurality of test area circles i.e., to represent simulated "spills" of hand sanitizer on the coating.

Each of the three applied pools of ethanol-water blend are allowed to remain on the tile for a contact time of 60 minutes. At the end of the 60 minute period, the entire tile is wiped with a wet paper towel, rinsed briefly with water, and allowed to dry for an additional 60 minutes.

After drying, another 60-degree gloss measurement is taken of the coating inside each of the three test circles which at this time ($T_{Et}$) have been exposed to the ethanol-water blend for 60 minutes. This second 60-degree gloss reading produces 60-degree gloss units at $T_{Et}$ (i.e., 60° GU @ $T_{Et}$).

The 60-degree gloss measurements obtained at $T_o$ and $T_{Et}$ enable calculation of % 60-degree gloss retention, which in turn is the equivalent of the herein designated "Ethanol Resistance Level," also referred to as $R_{Et}$. More particularly, $$R_{Et} = \%60° \text{ Gloss Retention}_{Et} = 100\% - [(60° \text{ GU}@T_o - 60° \text{ GU}@T_{Et})/60° \text{ GU}@T_o] \times 100\%.$$

In an embodiment, the Ethanol Resistance ($R_{Et}$) of the alcohol-resistant, chemically-strippable coating, as measured by the 60° Gloss Retention Test, is ≥60%, or ≥61%, or ≥65%, or ≥70%, or ≥75%, or ≥80%, or ≥85%, or ≥90%. In an embodiment, the Ethanol Resistance ($R_{Et}$) as measured by the 60° Gloss Retention Test, is from 61% to 120%, or from 65% to 115%, or from 70% to 100%, or from 75% to 95%, or from 80% to 95%.

In carrying out the Ethanol Resistance Test, the initial 60° gloss is generally measured at $T_o$, without buffing the coating which has been allowed to cure at room temperature (22° C.), 50% relative humidity, and 1 atmosphere pressure, for 24 hours before testing. However, in the event that the unbuffed coating has a 60° gloss at $T_o$ of less than 12 GU (gloss units), before testing the coating is buffed by making 6 passes over the coating with a UHS Whirlmatic Burnisher at 1500 RPM with a TASKI INTELLIPAD burnishing pad from Diversey. The Ethanol Resistance Test is carried out on coatings which exhibit 60° gloss at $T_o$ of at least 12 GU without buffing, or which exhibit 60° gloss at $T_o$ of at least 12 GU after the above-described buffing.

Alcohol-Resistant, Chemically-Strippable Coating Compositions No. 2 and No. 3

Alcohol-Resistant, chemically-strippable Coating Composition No. 2 and Coating Composition No. 3 were prepared using the ingredient addition order described in Table 3, below. Coating Composition No. 2 and Coating Composition No. 3 varied in ingredient type and level. Coating Composition No. 2 and Coating Composition No. 3 were prepared identically, except that they differed in the amount of ASR B33 alkali soluble resin (Coating Composition No. 2 contained 8 wt % ASR B33, vs. Coating Composition No. 3 which contained 16 wt % ASR B33). In addition, Coating Composition No. 2 contained 2.0 wt % WACKER HC 130 amine functional compound, whereas Coating Composition No. 3 contained 0% amine functional compound. Both Coating Composition No. 2 and Coating Composition No. 3 contained modified wax emulsions as used in Composition No. 1, i.e., prepared in accordance with Table 2, above.

TABLE 3

| | Solids (wt %) | Coating Composition No. 2 (wt. %) | Coating Composition No. 3 (wt. %) |
|---|---|---|---|
| De-ionized Water | 0 | 28.06 | 22.06 |
| HYDRIBUR ® 878 | 40 | 31.5 | 31.5 |
| NEOREZ ® 1073 | 35 | 11.0 | 11.0 |
| CARBITOL ® DE | 0 | 6.0 | 6.0 |
| DOWANOL ® DPnB | 0 | 2.4 | 2.4 |
| BYK ®-024 | 96 | 0.01 | 0.01 |
| CAPSTONE ® FS-60 | 40 | 0.03 | 0.03 |
| AC-316T ® modified wax emulsion | 35 | 4.0 | 4.0 |
| EPOLENE ® E-43 modified wax emulsion | 40 | 1.0 | 1.0 |
| ASR B33 Resin | 25.4 | 8.0 | 16.0 |
| WACKER ® HC 130 | 60 | 2.0 | 0 |
| PICASSIAN ® XL-702 | 40 | 6.0 | 6.0 |
| Total Ingredients | | 100.00 | 100.00 |

Procedure for the Preparation of Coating Composition No. 2

To a 250 mL beaker equipped with agitation means comprising a magnetic stir plate and a 1.5 inch TEFLON®-coated magnetic stir bar were charged, in the following order: (i) 28.06 gms deionized water, stirred at about 150 rpm, (ii) 31.5 gms HYDRIBUR® 878 aliphatic polyurethane-acrylic hybrid dispersion, 40% NV, from Air Products, Allentown, Pa., (iii) 11.0 gms NEOREZ® 1073 aliphatic polyurethane dispersion, 35% NV, from DSM Coating Resins, Wilmington, Mass., (iv) 6.0 grams CARBITOL® DE diethylene glycol monoethyl ether, (v) 0.01 gm BYK®-024 polysiloxane defoamer, 96% NV, from BYK-Chemie USA of Wallingford, Conn., (vi) 0.03 gram CAPSTONE® FS-60 wetting and leveling agent, 40% active fluorochemical, from DuPont, (vii) 4.0 grams AC-3161® wax emulsion (35% non-volatiles "NV", prepared from ingredients as described in Table 2, above, for wax emulsion compositions), (viii) 1.0 gm of EPOLENE® E-43 wax emulsion (40% NV, prepared from ingredients also described in Table B, above, for wax emulsion compositions), (ix) 8.0 grams ASR B-33 (25.4% NV) styrene-acrylic acid alkali soluble resin, a 19.6% dry weight styrene acrylic acid resin ammonium salt aqueous solution from Sealed Air (Diversey Division), Sturtevant, Wis., (x) 2.0 gms WACKER® HC 130 silicone emulsion, 60% NV, obtained from Wacker Chemical Corp. of Adrian, Mich.

The ingredients in the beaker were mixed for 30 minutes. After the 30 minute mixing period, 6.0 gms PICASSIAN® XL-702 multifunctional polycarbodiimide, 40% NV, obtained from Picassian Polymers of Peabody, Mass., was added and mixed for an additional 60 minutes.

As with Coating Composition No. 1, Coating Composition No. 2 was used to form Coating No. 2 on a vinyl composition tile. Assessment of Coating No. 2 revealed a Strippability Level of 93% and an Ethanol Resistance of 100%.

As with Coating Composition No. 1, Coating Composition No. 3 was used to form Coating No. 3 on a vinyl composition tile. Assessment of Coating No. 3 revealed a Strippability Level of 51% and an Ethanol Resistance of 95%.

The Strippability Level and Ethanol Resistance results for Coating Compositions No. 2 and No. 3 reveal that with the aqueous polyurethane/carbodiimide crosslinker system, improved Strippability Level and improved Ethanol Resistance are obtainable in a formulation containing both an alkali soluble resin and an amine functional compound, versus a formulation which is identical except that it contains no amine functional compound, even if it contains more alkali soluble resin.

Wax-Free Formulation

Alcohol-Resistant, chemically-strippable Coating Composition No. 4 and Coating Composition No. 5 were prepared, used to make coatings on vinyl composition tile, and tested for Strippability Level and Ethanol Resistance. Coating Composition No. 4 was a Control which contained both 3.79 wt % AC-316 Wax Emulsion and 0.95 wt % E-43 Wax Emulsion, both of which were the same as set forth in Table 2 and the accompanying description, above. Coating Compositions No. 4 and No. 5 were as set forth in Table 4, below. Upon testing, Control Coating No. 4 exhibited an Ethanol Resistance of 100.6%, and a Strippability Level of 48.3% using the Strippability Test but with only 100 cycles on the abrasion tester. No-Wax Coating No. 5 exhibited an Ethanol Resistance of 103.2%, and a Strippability Level of 97%, with only 100 cycles on the abrasion tester. However, the wax-free composition exhibited a slightly lower level of initial gloss.

TABLE 4

| | Solids (wt %) | Control Coating Composition No. 4 (wt. %) | No-Wax Coating Composition No. 5 (wt. %) |
|---|---|---|---|
| De-ionized Water | 0 | 43.84 | 48.25 |
| HYDRIBUR ® 878 | 40 | 23.07 | 23.07 |
| NEOREZ ® 1073 | 35 | 8.04 | 8.04 |
| CARBITOL ® DE | 0 | 7.4 | 7.4 |
| BYK ®-024 | 96 | 0.01 | 0.01 |
| CAPSTONE ® FS-60 | 40 | 0.03 | 0.03 |
| AC-316T ® modified wax emulsion | 35 | 3.53 | 0 |
| EPOLENE ® E-43 modified wax emulsion | 40 | 0.88 | 0 |
| Modified JONCRYL ® 50 Resin | 25.4 | 5.2 | 5.2 |
| WACKER ® HC 130 | 60 | 1.11 | 1.11 |
| PICASSIAN ® XL-732 | 40 | 6.89 | 6.89 |
| Total Ingredients | | 100.00 | 100.00 |

Polyurethane/Carbodiimide System: with and without ASR and AFC

Alcohol-Resistant, chemically-strippable Coating Composition No. 6 and Coating Composition No. 7 were prepared, used to make coatings on vinyl composition tile, and tested for Strippability Level and Ethanol Resistance. Coating Composition No. 6 contained neither an alkali soluble resin (ASR) nor an amine functional compound (AFC). In contrast, Coating Composition No. 7 contained both ASR and AFC. Coating Compositions No. 6 and No. 7 were prepared in accordance with Table 5, below.

TABLE 5

| | Solids (wt %) | Coating Composition No. 6 (wt. %) | Coating Composition No. 7 (wt. %) |
|---|---|---|---|
| De-ionized Water | 0 | 53.33 | 44.95 |
| HYDRIBUR ® 878 | 40 | 27.93 | 27.93 |
| CARBITOL ® DE | 0 | 7.40 | 7.40 |
| BYK ®-024 | 96 | 0.01 | 0.01 |
| CAPSTONE ® FS-60 | 40 | 0.03 | 0.03 |
| AC-316T ® modified wax emulsion | 35 | 3.53 | 3.53 |
| EPOLENE ® E-43 modified wax emulsion | 40 | 0.88 | 0.88 |
| Modified JONCRYL ® 50 Resin | 23.55 | 0 | 6.52 |
| WACKER ® HC 130 | 60 | 0 | 1.86 |
| PICASSIAN ® XL-732 | 40 | 6.89 | 6.89 |
| Total Ingredients | | 100.00 | 100.00 |

Coating Formulation No. 6 exhibited an Ethanol Resistance of 104.7%, but a Strippability Level of 16% using the Strippability Test. In contrast, Coating Formulation No. 7, which contained both ASR and AFC, exhibited an Ethanol Resistance of 98.6%, and a Strippability Level of 99.43%. A comparison of the Ethanol Resistance and Strippability Level of Coating Composition No. 6 vs. Coating Composition No. 7 demonstrates the surprising result: the presence of the ASR and AFC in the formulation imparts enhanced strippability while at the same time lowering Ethanol Resistance only slightly.

Coating Composition Variations I: Polyurethane+Carbodiimide System

An alcohol-resistant, chemically-strippable coating composition was developed as a two-component composition in which the base coating composition utilized a first component which was a polyurethane and the second component was a crosslinker for the first component. This base coating composition is herein called a Polyurethane and Crosslinker Base Formulation ("PU&CL Base Formulation").

One embodiment of a PU&CL Base Formulation had a first component containing a blend of a urethane-acrylic hybrid polymer and an aliphatic polyurethane and various additional ingredients, with the second component containing a carbodiimide crosslinker for the polyurethane. More specifically, when the two components were mixed together, the polyurethane in the first component was crosslinked by the carbodiimide crosslinker in the second component.

This PU&CL Base Formulation had the composition as set forth in the column headed "PU&CL Unmod (wt. %)" of Table 6, below. In addition, 13 modified PU&CL formulations were prepared, each differing from the PU&CL unmodified formulation in that differing combinations and/or quantities of one or more of (i) an alkali soluble resin (B33 alkali soluble resin) or (ii) an amine functional compound (WACKER® HC 130) were added.

TABLE 6

| | solids % | PU&CL Unmod (wt. %) | PU&CL Mod#1 (wt. %) | PU&CL Mod#2 (wt. %) | PU&CL Mod#3 (wt. %) | PU&CL Mod#4 (wt. %) | PU&CL Mod#5 (wt. %) | PU&CL Mod#6 (wt. %) | PU&CL Mod#7 (wt. %) |
|---|---|---|---|---|---|---|---|---|---|
| Component #1 | | | | | | | | | |
| De-ionized Water | 0 | 35.57 | 41.14 | 30.76 | 36.31 | 38.36 | 33.17 | 38.73 | 33.54 |
| HYDRIBUR ® 878 | 40 | 34.54 | 27.81 | 27.69 | 20.97 | 31.18 | 31.12 | 24.39 | 24.33 |
| NEOREZ ® 1073 | 35 | 12.08 | 9.72 | 9.68 | 7.33 | 10.9 | 10.88 | 8.53 | 8.51 |
| CARBITOL ® DE | 0 | 7.38 | 7.38 | 7.38 | 7.38 | 7.38 | 7.38 | 7.38 | 7.38 |
| BYK ®-024 | 100 | 0.01 | 0.01 | 0.01 | 0.01 | 0.01 | 0.01 | 0.01 | 0.01 |
| CAPSTONE ® FS-60 | 40 | 0.03 | 0.03 | 0.03 | 0.03 | 0.03 | 0.03 | 0.03 | 0.03 |
| AC-316T ® modified wax emulsion | 35 | 3.52 | 3.52 | 3.52 | 3.52 | 3.52 | 3.52 | 3.52 | 3.52 |
| EPOLENE ® E-43 modified wax emulsion | 35 | 0.88 | 0.88 | 0.88 | 0.88 | 0.88 | 0.88 | 0.88 | 0.88 |

TABLE 6-continued

| | | | | | | | | | |
|---|---|---|---|---|---|---|---|---|---|
| B33 alkali soluble resin | 23.40 | 0 | 0 | 14.06 | 14.06 | 0 | 7.03 | 7.03 | 14.06 |
| WACKER ® HC 130 Component #2 | 20 | 0 | 3.52 | 0 | 3.52 | 1.76 | 0 | 3.52 | 1.76 |
| PICASSIAN ® 702 | 40 | 6 | 6 | 6 | 6 | 6 | 6 | 6 | 6 |
| Total Solids % | | 100.01 22.01 | 100.01 19.19 | 100.01 22.00 | 100.01 19.19 | 100.01 20.60 | 100.01 22.00 | 100.01 19.19 | 100.01 20.59 |

| Table 1 (continued) | Solids % | PU&CL Mod#8 (wt. %) | PU&CL Mod#9 (wt. %) | PU&CL Mod#10 (wt. %) | PU&CL Mod#11 (wt. %) | PU&CL Mod#12 (wt. %) | PU&CL Mod#13 (wt. %) |
|---|---|---|---|---|---|---|---|
| Component #1 | | | | | | | |
| De-ionized Water | 0 | 35.76 | 38.55 | 33.36 | 36.13 | 35.95 | 22.06 |
| HYDRIBUR ® 878 | 40 | 31.15 | 27.78 | 27.72 | 24.36 | 27.75 | 31.50 |
| NEOREZ ® 1073 | 35 | 10.89 | 9.71 | 9.69 | 8.52 | 9.70 | 11.00 |
| CARBITOL ® DE | 0 | 7.38 | 7.38 | 7.38 | 7.38 | 7.38 | 8.4 |
| BYK ®-024 | 100 | 0.01 | 0.01 | 0.01 | 0.01 | 0.01 | 0.01 |
| CAPSTONE ® FS-60 | 40 | 0.03 | 0.03 | 0.03 | 0.03 | 0.03 | 0.03 |
| AC-316T ® modified wax emulsion | 35 | 3.52 | 3.52 | 3.52 | 3.52 | 3.52 | 3.52 |
| EPOLENE ® E-43 modified wax emulsion | 35 | 0.88 | 0.88 | 0.88 | 0.88 | 0.88 | 0.88 |
| B33 alkali soluble resin | 23.40 | 3.515 | 3.515 | 10.545 | 10.545 | 7.03 | 16 |
| WACKER ® HC 130 Component #2 | 20 | 0.88 | 2.64 | 0.88 | 2.64 | 1.76 | 0 |
| PICASSIAN ® 702 | 40 | 6 | 6 | 6 | 6 | 6 | 6 |
| Total Solids % | | 100.01 21.30 | 100.01 19.89 | 100.01 21.30 | 100.01 19.89 | 100.01 20.60 | 100.01 24.69 |

The Unmodified PU&CL formulation, together with modified PU&CL formulations, were evaluated for Strippability Level and Ethanol Resistance, using the tests described above. The results were as set forth in Table 7, below, with the various formulations arranged in order of increasing Strippability Level (%).

TABLE 7

| Example | Alkali Soluble Resin (wt %) | Amine Functional Compound (wt %) | Strippability Level (%) | Alcohol Resistance (%) |
|---|---|---|---|---|
| PU&CL mod#1 | 0 | 3.52 | 3% | >60 |
| PU&CL unmodified | 0 | 0 | 4% | >60 |
| PU&CL mod#4 | 0 | 1.76 | 6% | >60 |
| PU&CL mod#8 | 3.5 | 0.88 | 26% | >60 |
| PU&CL mod#10 | 10.5 | 0.88 | 45% | >60 |
| PU&CL mod#13 | 16 | 0 | 50% | >60 |
| PU&CL mod#9 | 3.5 | 2.64 | 51% | >60 |
| PU&CL mod#2 | 14 | 0 | 54% | >60 |
| PU&CL mod#12 | 7 | 1.76 | 57% | >60 |
| PU&CL mod#5 | 7 | 0 | 66% | >60 |
| PU&CL mod#7 | 14 | 1.76 | 81% | >60 |
| PU&CL mod#6 | 7 | 3.52 | 88% | >60 |
| PU&CL mod#11 | 10.5 | 2.64 | 90% | >60 |
| PU&CL mod#3 | 14 | 3.52 | 94% | >60 |

As is apparent from a review of Table 7, of the 14 examples, the 3 examples with 0% alkali soluble resin all exhibited a Strippability Level of 6% or less. Moreover, the 9 examples containing the alkali soluble resin at a level of at least 7 wt % exhibited a Strippability Level of at least 45%. Furthermore, Example PU&CL #9, with only about 3.5% alkali soluble resin, exhibited a Strippability Level of 51%, apparently because it also contained 2.64 wt % of the amine functional compound. In contrast, Example PU&CL mod #8, which also contained about 3.5 wt % alkali soluble resin, exhibited a strippability level of only 26%, apparently because it only contained 0.88 wt % amine functional compound. Thus, both the alkali soluble resin and the amine functional compound assist in achieving a high Strippability Level.

Coating Composition Variations II: Polyol+Polyisocyanate System

A commercially-available alcohol-resistant, chemically-strippable coating formulation was obtained from the marketplace, marketed as MAXX DURABLE® floor finish. It was a two-component formulation made up of Part A and Part B, which were mixed together before application to a floor substrate. Part A contained a polyol, and Part B contained a diisocyanate.

It is believed that the formulation of MAXX DURABLE® floor finish may be as disclosed in Table 28 on Page 9 of Pub. No. US 2012/0107508 A1, to Li et al, entitled "Polyurethane Floor Finishes with Hybrid Performance." Table 8, below, includes information available in Table 28 of Pub. No. US 2012/0201963 A1, with additional information added on the source of the various compositions present in each of Component A and Component B:

TABLE 8

| | Wt % |
|---|---|
| Part A (mixing ratio 94.72 wt %) | |
| SF 5000 (NMP free version of QWF 4744, from Henkel) | 44.80 |
| Distilled Water | 52.04 |
| TEGO FOAMEX 805 (polyether siloxane copolymer surfactant from Tego) | 0.11 |
| 50/50 blend of water and SE-21 (defoamer from Wacker), | 0.11 |
| POLY EMULSION325G (polyethylene wax from ChemCor) | 2.94 |

TABLE 8-continued

| | Wt % |
|---|---|
| Part B (mixing ratio 5.28%) | |
| RHODOCOAT EZ-M502 (polyisocyanate from Rhodia) | 85.0 |
| DMPA dipropylene glycol methyl ether acetate (multiple sources) | 15.0 |

The above formulation is herein referred to as the Polyol & Polyisocyanate Base Formulation ("POL&PIC Base Formulation"). This formulation was evaluated for its Strippability Level (using the procedure described above) and for its Ethanol Resistance (also using the procedure described above). It is believed that the POL&PIC Base Formulation does not contain any alkali soluble resin or any amine functional compound as used in the formulation and coating of the present invention. For this reason, a coating made from the POL&PIC Base Formulation, although ethanol resistant, does not exhibit the ease of strippability of the alcohol-resistant coating in accordance with the present invention. However, the POL&PIC Base Formulation was used as a component of various modified formulations as set forth in Table 9, below.

TABLE 9

| Sample Identity | Alkali Soluble Resin (wt %) | Amine Functional Compound (wt %) | Ethanol Resistance (%60° Gloss Retention) | Strippability Level (%) |
|---|---|---|---|---|
| POL&PIC Base Formulation: unmod | 0 | 0 | 94, 101 | 1.3 |
| Mod POL&PIC Base Formulation #1 | 0 | 2 | 93 | 1 |
| Mod POL&PIC Base Formulation #2 | 0 | 4 | NM | NM |
| Mod POL&PIC Base Formulation #3 | 0 | 6 | 85 | 0 |
| Mod POL&PIC Base Formulation #4 | 7 | 0 | 89 | 15 |
| Mod POL&PIC Base Formulation #5 | 7 | 2 | 92 | 18 |
| Mod POL&PIC Base Formulation #6 | 7 | 4 | 64 | 97.3 |
| Mod POL&PIC Base Formulation #7 | 7 | 6 | 60 | 99 |
| Mod POL&PIC Base Formulation #8 | 14 | 0 | 76 | 98 |
| Mod POL&PIC Base Formulation #9 | 14 | 2 | NM | NM |
| Mod POL&PIC Base Formulation #10 | 14 | 4 | 72 | 99 |
| Mod POL&PIC Base Formulation #11 | 14 | 6 | NM | NM |
| Mod POL&PIC Base Formulation #12 | 21 | 0 | 112 | 100 |
| Mod POL&PIC Base Formulation #13 | 21 | 2 | 87 | 100 |
| Mod POL&PIC Base Formulation #14 | 21 | 4 | NM | NM |
| Mod POL&PIC Base Formulation #15 | 21 | 6 | 74 | 100 |

NM = not measured

As can be seen in Table 9, above, an unmodified sample of the POL&PIC Base Formulation was evaluated for Ethanol Resistance and Strippability Level by the tests set forth above. Although the unmodified POL&PIC Base Formulation could be used to produce a coating having high alcohol resistance, it exhibited a Strippability Level of only 1.3% by the test above, which is consistent with the fact that the stripping composition recommended for the POL&PIC Base Formulation contains potassium hydroxide, which is a strong base and is highly corrosive. The presence of potassium hydroxide in the recommended stripper may be the reason that the POL&PIC Base Formulation is not it not recommended for use on linoleum, rubber, marble, or wood floors.

In Table 9, fifteen different modified formulations were made using the POL&PIC Base Formulation. The 15 modified formulations were made by the addition of various amounts of an alkali soluble resin and/or an amine functional compound. The alkali soluble resin was added to modified formulations #4 through #15, and the amine functional compound was added to modified formulations #1-#3, #5-#7, #9-#11, and #13-#15. The alkali soluble resin added was the modified JONCRYL 50® styrene acrylic resin solution described above. The amine functional compound added was Wacker Silicone HC130 silicone emulsion, 60% NV, obtained from Wacker Chemical Corp. of Adrian, Mich.

As can be seen from the results, the Strippability Level was increased by the addition of the alkali soluble resin, as well as by the addition of the amine functional compound. As can be appreciated by reviewing the Strippability Level test procedure, the Strippability Level reported in Table 9 does not require the use of a stripper requiring a strong base such as potassium hydroxide. Moreover, the stripper used in the Strippability Level test is suitable for use on linoleum, rubber, marble, and wood floors, in addition to floors made from vinyl composition tile.

The results in Table 9 also demonstrate that the addition of the alkali soluble resin and the amine functional compound work together to vastly improve the Strippability Level of the POL&PIC Base Formulation using a less caustic stripper, while surprisingly having a relatively small degradation of the Ethanol Resistance level as measured by the gloss test described above. This result is surprising because high Ethanol Resistance would be expected to correlate with decreased strippability, as the high ethanol resistance is a resistance to stripping with ethanol, a known solvent.

In summary, it has been discovered that the addition of the alkali soluble resin and the amine functional compound makes the coating significantly easier to strip, while the desired ethanol-resistance is only marginally reduced.

The coating composition can be provided as a two-component reactive floor coating composition in a multi-functional package. The multi-functional package provides (i) complete and separated containment of a first reactive liquid component and a second reactive liquid component during storage and shipment, (ii) complete and unseparated containment of the first and second reactive liquid components during contact and intermixture with one another, and (iii) controlled containment and controlled dispensing of the reactive liquid components after their contact and intermixture with one another.

The two-component reactive floor coating composition in the multi-functional package comprises: (A) a first reactive liquid component sealed inside a closed primary pouch comprising a primary pouch film, with the first reactive liquid component being in direct contact with an inside surface of the primary pouch; (B) a second reactive liquid component inside a closed secondary pouch comprising a secondary pouch film, the second pouch being is a burstable pouch, the secondary pouch being sealed inside the primary pouch, the secondary pouch comprising the second reactive liquid component in direct contact with an inside surface of the secondary pouch, with an outside surface of the secondary pouch being in direct contact with the first reactive liquid component; and (C) a fitment attached to the primary pouch for the controlled dispensing of the first reactive liquid component and the second reactive liquid component after they have been combined and intermixed inside the primary pouch.

The primary pouch has at least one external seal of a peripheral section of the primary pouch film to itself along a perimeter edge portion of the primary pouch, and at least one internal seal of the primary pouch film to itself at an interior portion of the primary pouch. The internal seal divides the primary pouch into a first compartment and a second compartment.

The first and second compartments are connected to one another with a liquid flow passageway. The second compartment is sized for confinement of the secondary pouch during storage, transport, and application of pressure to burst the secondary pouch. The internal seal extends from a first location on the peripheral edge portion of the primary pouch toward a second location on the peripheral edge portion of the primary pouch. The internal seal extends across from 55 to 85 percent of an internal distance between the first location and the second location. The internal seal terminates with an internal end before reaching the second location, leaving the liquid flow passageway being between the internal end of the internal seal and the second location.

The width of the liquid flow passageway is: (a) up to 75 percent of the length of the secondary pouch, and (b) 15 to 45 percent of the distance between the first location and the second location. The liquid flow passageway has a centerpoint in a position within 7.5% to 22.5% of the second location, based on the distance between the first location and the second location.

In an embodiment, the first reactive liquid component comprises an aqueous emulsion comprising at least one member selected from the group consisting of a crosslinkable polyurethane and a crosslinkable polyurea, and the second reactive liquid component comprises at least one polyfunctional crosslinker selected from the group consisting of carbodiimide, glycidyl epoxide, acetoacetoxy, diacetone, alkoxysilane, amine, hydroxyl, isocyanate, aziridine, hydrazide, and epoxide.

In an embodiment, the first reactive liquid component comprises at least one polyfunctional crosslinker selected from the group consisting of carbodiimide, glycidyl epoxide, acetoacetoxy, diacetone, alkoxysilane, amine, hydroxyl, isocyanate, aziridine, hydrazide, and epoxide and the second reactive liquid component comprises an aqueous emulsion of at least one member selected from the group consisting of crosslinkable polyurethane and crosslinkable polyurea.

In an embodiment, the first reactive liquid component comprises an aqueous dispersion of at least one member selected from the group consisting of polyol, polyamine, and polyhydrazide, and the second reactive liquid component comprises a polyisocyanate and an organic solvent, such that when combined the first and second components have no more than 1 wt % organic solvent having a vapor pressure of greater than 0.1 mm Hg at 20° C.

In an embodiment, the first reactive liquid component comprises a polyisocyanate material and an organic solvent, and the second reactive liquid component comprises an aqueous dispersion of at least one member selected from the group consisting of polyol, polyamine, and polyhydrazide, such that when combined the first and second components have no more than 1 wt % organic solvent having a vapor pressure of greater than 0.1 mm Hg at 20° C.

In an embodiment, the secondary pouch further comprises a burst membrane which is different from the secondary pouch film, wherein the rupture stress of the burst membrane is less than the rupture stress of the secondary pouch film. The secondary pouch film and the burst membrane may both be substantially impermeable to water vapor.

In an embodiment, the secondary pouch comprises a frangible seal having a failure stress less than the rupture stress of the secondary pouch film. In an embodiment, the secondary pouch film and the burst membrane may both be substantially impermeable to water vapor.

In an embodiment, the first reactive liquid component is present in an amount of from 1 to 5 liters and the second reactive liquid component is present in an amount of from 0.07 to 0.35 liter. The primary pouch film comprises ethylene/α-olefin copolymer and polyamide and has a thickness of from 6 to 20 mils, and the secondary pouch film comprises ethylene/α-olefin copolymer and polyester and has a thickness of from 2 to 5 mils. The internal seal extends across from 70 to 85 percent of the internal distance between the first location and the second location, and the width of the liquid flow passageway is from 15 to 30% of the distance between the first and second locations. The centerpoint of the liquid flow passageway is in a position from 7.5% to 22.5% of the second location, based on the distance between the first location and the second location. Optionally, the package comprises from 50 to 500 cubic centimeters of air.

In an embodiment, the first reactive liquid component is present in an amount of from 1.2 to 4 liters and the second reactive liquid component is present in an amount of from 0.084 to 0.28 liter. The primary pouch film comprises ethylene/α-olefin copolymer and polyamide and has a thickness of from 7 to 15 mils, and the secondary pouch film comprises ethylene/α-olefin copolymer and polyester and has a thickness of from 3 to 4 mils. The internal seal extends across from 75 to 83 percent of the internal distance between the first location and the second location. The width of the liquid flow passageway is from 17 to 25% of the distance between the first and second locations. The centerpoint of the liquid flow passageway is in a position from 8.5% to 16.5% of the second location, based on the distance between the first location and the second location. Optionally, the package comprises from 60 to 400 cubic centimeters of air.

In an embodiment, the first reactive liquid component is present in an amount of from 1.2 to 2 liters and the second reactive liquid component is present in an amount of from 0.084 to 0.140 liter. The primary pouch film comprises ethylene/α-olefin copolymer and polyamide and has a thickness of from 8 to 10 mils, and the secondary pouch film comprises ethylene/α-olefin copolymer and polyester and has a thickness of from 3.3 to 3.7 mils. The internal seal extends across from 78 to 82 percent of the internal distance between the first location and the second location. The width of the liquid flow passageway is from 18 to 22% of the distance between the first and second locations. The centerpoint of the liquid flow passageway is in a position from 9% to 13% of the second location, based on the distance between the first location and the second location. Optionally, the package comprises from 70 to 300 cubic centimeters of air.

In an embodiment, the first reactive liquid component comprises an aqueous emulsion of a crosslinkable polyurethane, the second reactive liquid component comprises a carbodiimide crosslinker, and the secondary pouch further comprises a burst membrane which is different from the secondary pouch film, and the rupture stress of the burst membrane is less than the rupture stress of the secondary pouch film. The first reactive liquid component may be present in an amount of from 1.2 to 2 liters and the second reactive liquid component may be present in an amount of from 0.084 to 0.140 liter. The primary pouch film may comprise ethylene/α-olefin copolymer and polyamide and has a thickness of from 8 to 10 mils, and the secondary pouch film may comprise ethylene/α-olefin copolymer and polyester and may have a thickness of from 3.3 to 3.7 mils. The internal seal may extend across from 78 to 82 percent of the internal distance between the first location and the second location, and the width of the liquid flow passageway may be from 18 to 22% of the distance between the first and second locations. The centerpoint of the liquid flow passageway may be in a position from 9% to 13% of the second location, based on the distance between the first location and the second location. The package may comprise from 70 to 300 cubic centimeters of air. The dispensing fitment may comprise a valve.

In an embodiment, the first reactive liquid component comprises an aqueous emulsion of at least one polyol material and optionally at least one wax, and the second reactive liquid component comprises a polyisocyanate material and at least one organic solvent, and when combined the first and second reactive liquid components have no more than 1 wt % organic solvent having a vapor pressure of greater than 0.1 mm Hg at 20° C. The secondary pouch comprises a frangible seal having a failure stress less than the rupture stress of the secondary pouch film and the secondary pouch film is substantially impermeable to water vapor. The first reactive liquid component may be present in an amount of from 1.2 to 2 liters and the second reactive liquid component may be present in an amount of from 0.084 to 0.140 liter. The primary pouch film may comprise ethylene/α-olefin copolymer and polyamide and may have a thickness of from 8 to 10 mils. The secondary pouch film may comprise ethylene/α-olefin copolymer, polyester, and a vapor barrier layer, and the secondary pouch may have a thickness of from 3.3 to 3.7 mils. The internal seal may extend across from 78 to 82 percent of the internal distance between the first location and the second location, and the liquid flow passageway width may be from 18 to 22% of the distance between the first and second locations. The centerpoint of the liquid flow passageway may be in a position from 9% to 13% of the second location, based on the distance between the first location and the second location. The package may comprise from 70 to 300 cubic centimeters of air. The dispensing fitment may further comprise a valve.

Figure 2:
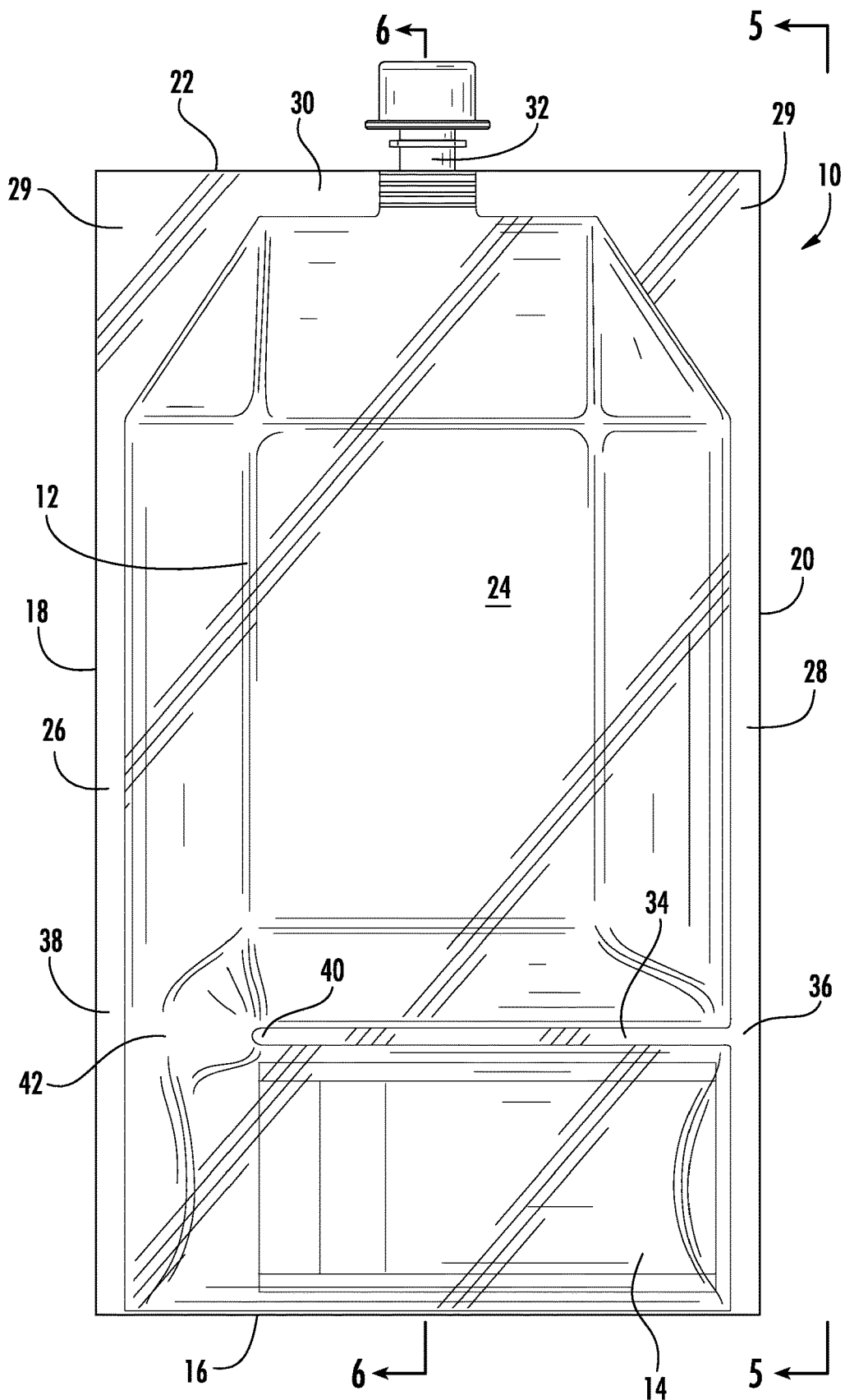
FIG. 2 is top view of the multi-functional, two-pouch package illustrated in FIG. 1.

FIG. 1 is a perspective view of an embodiment of a multi-functional, two-pouch package 10 containing two reactive components. FIG. 2 is a view from above of the package of FIG. 1. FIGS. 1 and 2 illustrate package 10 in a position for filling the primary pouch with the first reactive liquid component. However, during use package 10 is usually inverted so that gravity is used to dispense liquid through fitment 32.

Viewing FIGS. 1 and 2 together, package 10 has primary pouch (i.e., outer pouch) 12 and secondary pouch (i.e., inner pouch) 14. Primary pouch 12 is made from a single piece of film 24 folded in half, with top folded edge 16, first side edge 18, second side edge 20, and bottom edge 22. Primary pouch 12 has a perimeter seal including first side seal 26 along first side edge 18, second side seal 28 along second side edge 20, bottom seal 30 along bottom edge 22, with bottom seal 30 being sealed to a flange portion of dispensing fitment 32. Corners 29 can also be sealed as illustrated, to assist in ensuring that liquid does not hang up in the corners during dispensing.

Primary pouch 12 also has internal seal 34 extending inwardly from a first location 36 along second side seal 28 towards a second location 38 along first side seal 26. Internal seal 34 stops at internal seal end 40, i.e., without reaching location 38 on first side seal 26, thereby leaving liquid flow passageway 42 between first side seal 38 and end 40 of internal seal 34. Internal seal 34 divides primary pouch 12 into first compartment 25 and second compartment 27, with internal seal 34 confining secondary pouch 14 inside second compartment 27.

Figure 3:
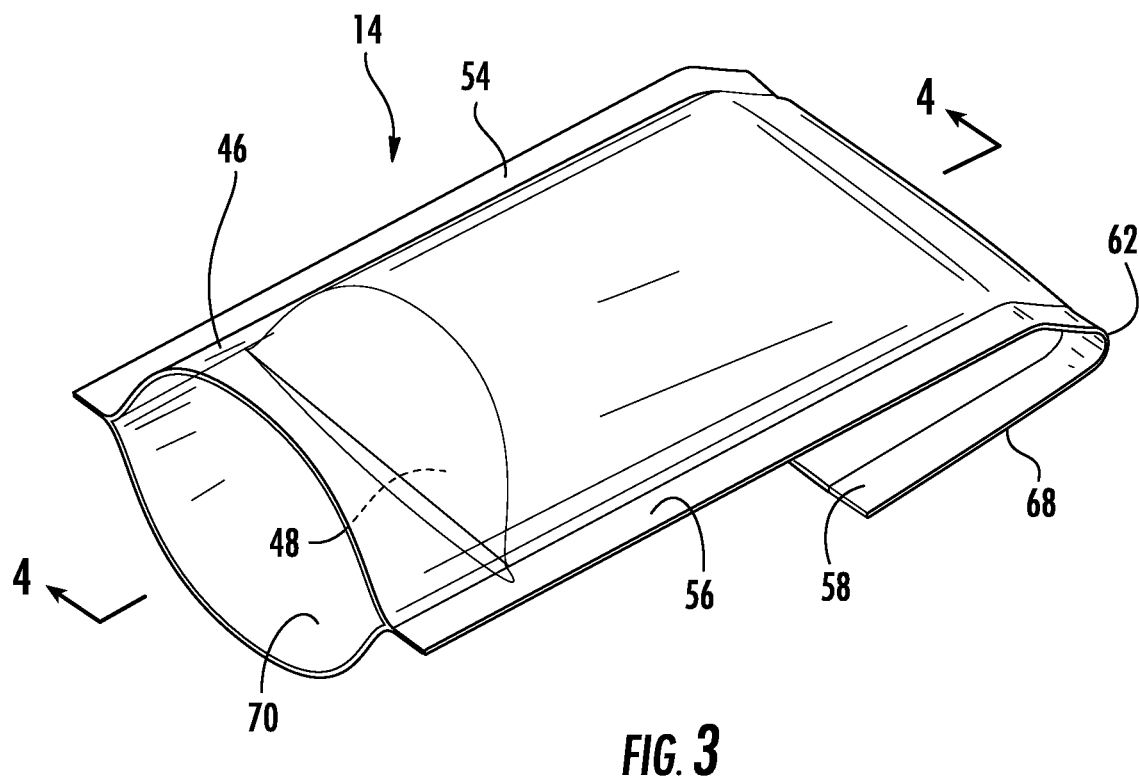
FIG. 3 is a cross-sectional view taken through section 4-4 of FIG. 3.
Figure 4:
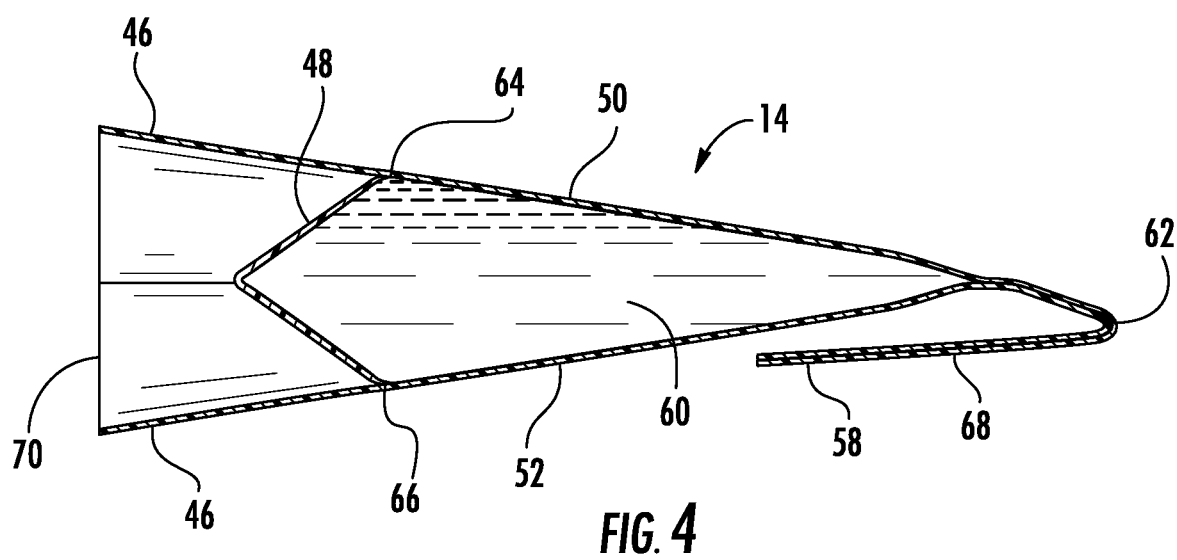
FIG. 4 is a cross-sectional view taken through section 4-4 of the secondary pouch illustrated in FIG. 3.

FIG. 3 is a perspective view of the secondary pouch 14 of the multi-functional, two-pouch package 10 illustrated in FIGS. 1 and 2. FIG. 4 is a longitudinal cross-sectional view of secondary pouch 14 taken through section 4-4 of FIG. 3. Viewing FIGS. 3 and 4 together, secondary pouch 14 comprises secondary pouch film 46 and burst membrane 48. Secondary pouch film 46 is present in the form of upper wall 50 and lower wall 52, which are sealed together at first side seal 54, second side seal 56, and bottom seal 58. One edge of burst membrane 48 is heat sealed to upper wall 50 at heat seal 64. An opposing edge of burst membrane 48 is heat sealed to lower wall 50 at heat seal 66.

Inside secondary pouch 14 is second reactive liquid component 60. FIGS. 2 and 3 illustrate secondary pouch 14 in a folded configuration, with fold 62, as secondary pouch 14 is illustrated inside primary pouch 12 in FIGS. 1 and 2. Excess film 68 making up the collapsed "tail" of secondary pouch 14, which is folded under the remainder of secondary pouch 14 at fold 62, allows pouch 14 to be filled and thereafter sealed closed at bottom seal 58, with seal 58 being made at a distance from second reactive liquid component 60. Sealing the secondary pouch with a tail leaves less chance for liquid contamination in the area of seal 58, and can also be carried out in a manner so as to leave air (not illustrated) inside secondary pouch 14. The presence of air may ease the process of bursting burst membrane 48 during the use of the package. Secondary pouch film 46 provides open end 70 so that upon rupture of burst membrane 48, the second reactive liquid component 60 exits secondary pouch 14 and contacts primary reactive liquid component inside primary pouch 10.

FIG. 5 is perspective side view taken from the right hand side of the package 10 shown as view 5-5 in FIG. 2. This view illustrates first compartment 25 containing the first reactive liquid component, and second compartment 27 containing secondary pouch 14 containing the second reactive liquid component. FIG. 5 also illustrates the manner in which internal seal 34 is a bond of the front panel and back panels of primary pouch film 24 to one another, constricting package 10 in the area of internal seal 34. FIG. 5 also illustrates the manner in which the first reactive liquid component forces the front and back panels of the primary pouch apart to provide fluid flow passageway 42 between first compartment 25 and second compartment 27.

FIG. 6 is a longitudinal cross-sectional view of package 10 taken through section 6-6 as shown in FIGS. 1 and 2. FIG. 6 illustrates first compartment 25 within primary pouch 12 and second compartment 27 also within primary pouch 12. Secondary pouch 14 containing second reactive liquid component 60 is inside second compartment 27, retained between top fold 16 and internal seal 34. First compartment 25 of primary pouch 12 contains first reactive liquid component 72.

Figure 7:
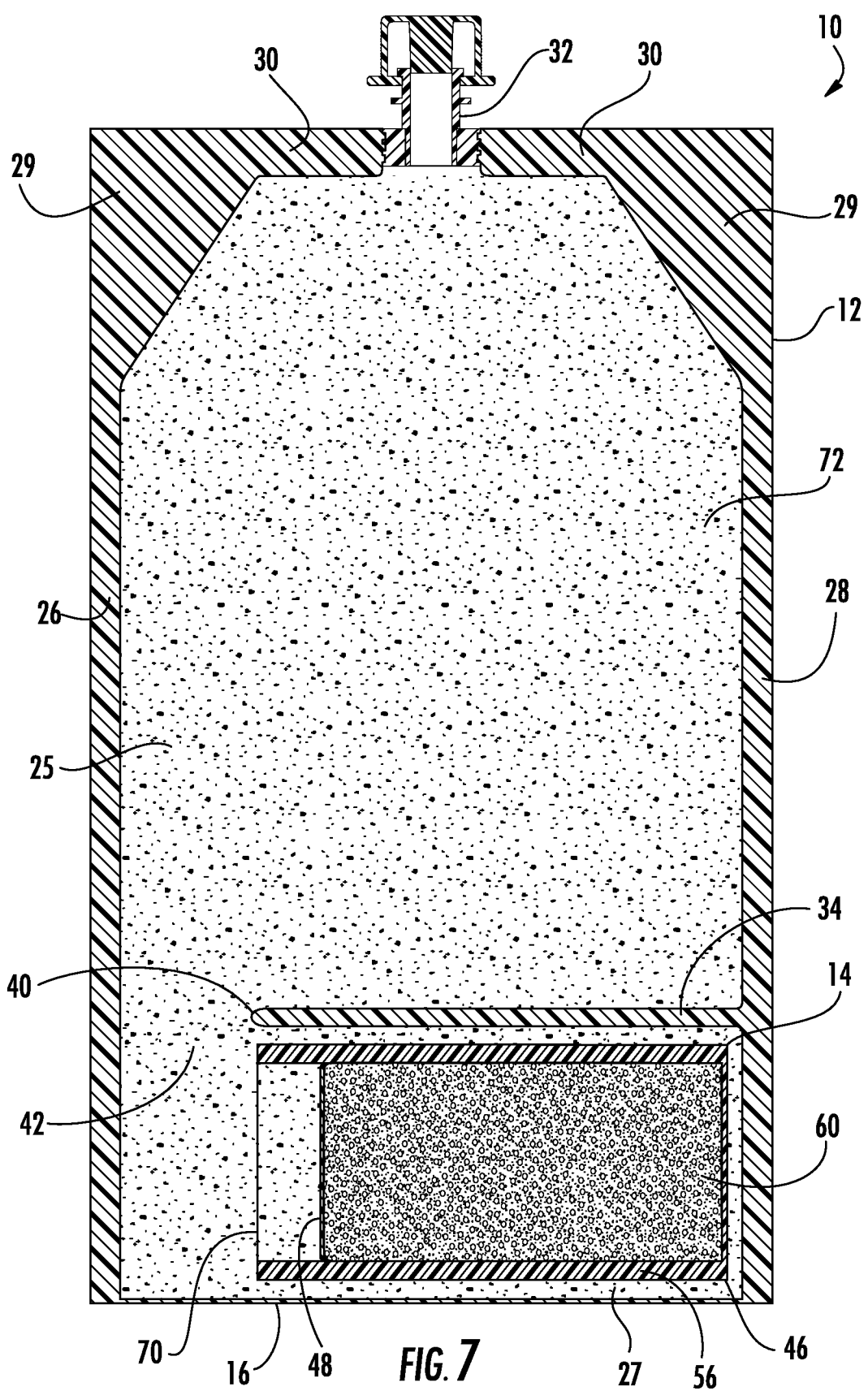
FIG. 7 is a cross-sectional view of the multi-functional, two-pouch package containing two reactive components as illustrated in FIG. 5, taken through section 7-7 of FIG. 5.

FIG. 7 is a longitudinal cross-sectional view of package 10 taken through section 7-7 of FIG. 5. FIG. 7 illustrates package 10 in a storage/shipping mode, with the first and second liquid reactive components separated from one another. FIG. 7 illustrates primary pouch 12 having first compartment 25 and second compartment 27 separated by internal seal 34, with secondary pouch 14 inside second compartment 27. First reactive liquid 72 is present inside primary pouch 12, and is present in both first compartment 25 and second compartment 27. Secondary pouch 14 is made from secondary pouch film 46 sealed to burst membrane 48. Secondary pouch 14 contains second reactive liquid component 60.

Figure 8:
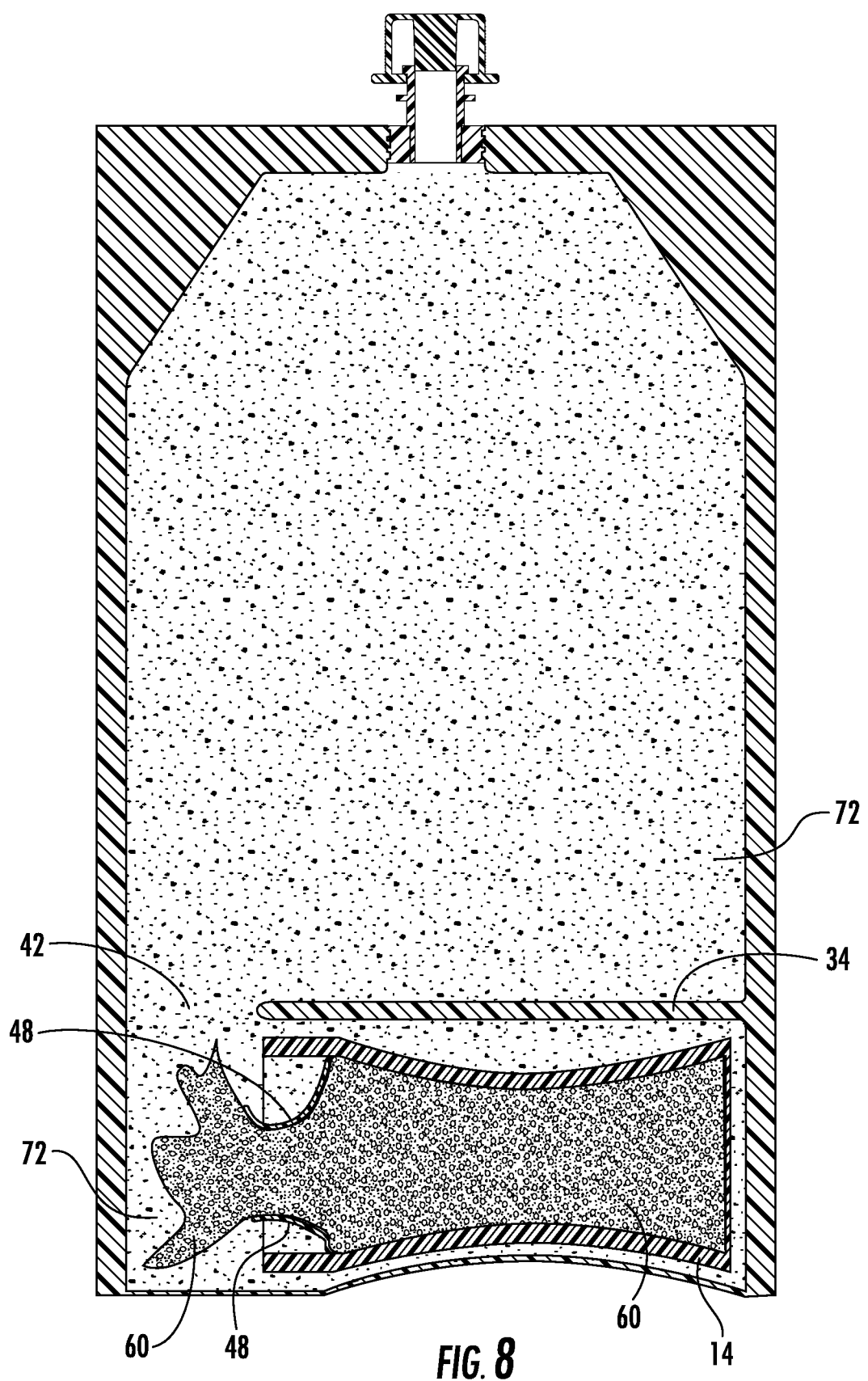
FIG. 8 is a schematic of the cross-sectional view of FIG. 7, immediately after bursting the secondary pouch.

FIG. 8 illustrates the same longitudinal cross-sectional view illustrated in FIG. 7, but FIG. 8 is a schematic rendition after secondary pouch 14 has just been opened by the fracture of burst membrane 48 upon the application to pouch 14 of sufficient pressure to cause burst membrane 48 to rupture. Upon bursting, second liquid reactive component 60 exits secondary pouch 14, contacting first liquid reactive liquid component 72, with the two liquid reactive components beginning to mix with each other.

Figure 9:
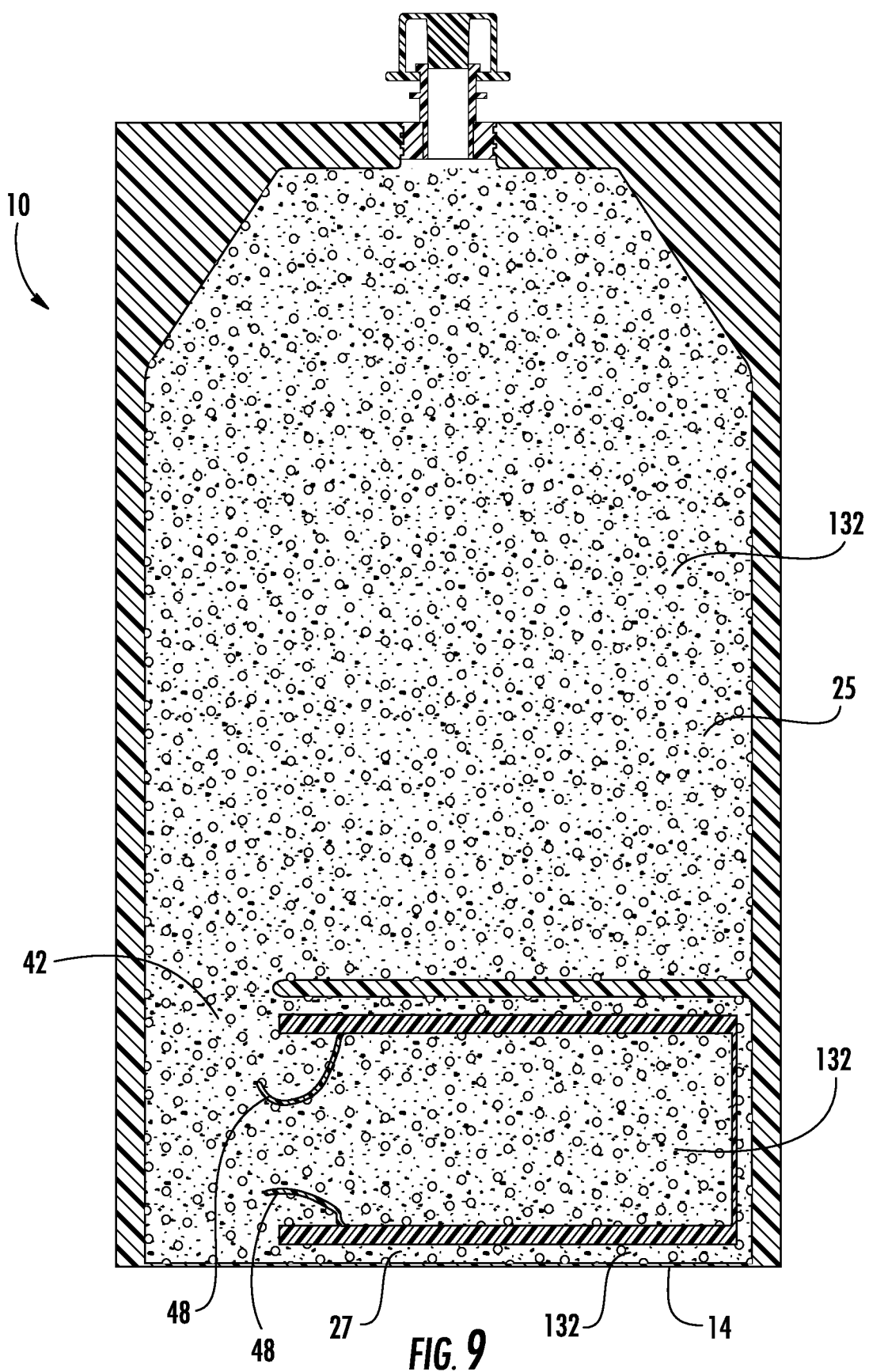
FIG. 9 is schematic of the cross-sectional view of FIGS. 7 and 8, after mixing the first and second reactive components of the primary pouch with the contents of the secondary pouch.

FIG. 9 illustrates package 10 after mixing is complete, with the fracture of burst membrane 48 plus manipulation of package 10 to causing first and second liquid reactive components 60 and 72 (see FIG. 8) to combined and intermix with one another to form uniform liquid mixture 132 as illustrated in FIG. 9, which after mixing is throughout first compartment 25 and second compartment 27, and which is also present inside burst secondary pouch 14. At this stage, package 10 is in condition to be inverted so that liquid mixture 132 can be dispensed.

What is claimed is:

1. A coated floor comprising:
   (A) a flooring substrate, and
   (B) a chemically-strippable, alcohol-resistant coating on the flooring substrate, the coating comprising:
      (i) at least one crosslinked polymer selected from the group consisting of crosslinked polyurethane, crosslinked acrylic polymer, and crosslinked polyurea;
      (ii) alkali soluble resin; and
      (iii) an amine functional compound;
   wherein the coating exhibits:
      (a) a Strippability Level of at least 40% as measured by percent coating stripped from a tile after 300 cycles using a Modified ASTM D1792-82 Strippability Test Procedure with a stripping solution consisting of 4 wt % monoethanolamine, 1 wt % diethyleneglycol butylether, 0.1% ethylenediamine tetracetic acid, 0.25 wt % $C_{9-11}$ alcohol ethoxylate, 2.6 wt % benzyl alcohol, and 92.05 wt % water, and
      (b) an Ethanol Resistance ($R_{E1}$) of at least 60 percent, as measured by a 60° Gloss Retention Test re upon exposure to 0.33 milliliter/in2 of a blend of 67.5 wt % ethanol and 32.5 wt % water for a period of 60 minutes at 72° F. and relative humidity of 50%, wherein:

$$R_{E1} = \%60° \text{ Gloss Retention}_{E1} = 100\% - [(60° \text{ GU}@T_o - 60° \text{ GU}@T_{E1})/60° \text{ GU}@T_o] \times 100\%.$$

2. The coated floor according to claim 1, wherein the crosslinked polymer is present in the coating in an amount of from 30 to 98 wt % based on coating weight, the alkali soluble resin is present in the coating in an amount of from 1 to 15 wt %, based on coating weight, and the amine functional compound is present in the coating in an amount of from 0.1 to 10 wt %, based on coating weight.

3. The coated floor according to claim 1, wherein the crosslinked polymer is formed by crosslinking an polyurethane with a carbodiimide, and the crosslinked polymer is present in an amount of from 60 to 95 wt % based on coating weight, the alkali soluble resin is present in the coating in an amount of from 2 wt % to 10 wt %, based on coating weight, and the amine functional compound is present in the coating in an amount of from 1 to 5 wt %, based on coating weight, or wherein the crosslinked polymer is formed by crosslinking a polyol with polysocyanate, and the crosslinked poymer is present in an amount of from 60 wt % to 95 wt % based on coating weight, the alkali soluble resin is present in the coating in an amount of from 4 wt % to 12 wt %, based on coating weight, and the amine functional compound is present in the coating in an amount of from 1 to 8 wt %, based on coating weight.

4. The coated floor according to claim 1, wherein the coating comprises a wax in an amount of from 5 wt % to 15 wt %, based on coating weight.

5. The coated floor according to claim 1, wherein the alkali soluble resin has a weight average molecular weight of from 500 to 10,000.

6. The coated floor according to claim 1, wherein the alkali soluble resin comprises at least one member selected from the group consisting of acrylic-acrylic acid resin, styrene-acrylic acid resin, styrene-α-methyl styrene-acrylic acid resin, styrene-acrylic-acrylic acid resin, styrene-α-methyl styrene-acrylic-acrylic acid resin, acrylic-methacrylic acid resin, styrene-methacrylic acid resin, styrene-methyl styrene-methacrylic acid resin, styrene-acrylic-methacrylic acid resin, styrene-α-methyl styrene-acrylic-methacrylic acid resin, styrene-maleic anhydride resin, and polycarboxypolyamide resin.

7. The coated floor according to claim 1, wherein the alkali soluble resin has an acid number of at least 100.

8. The coated floor according to claim 1, wherein the amine functional compound comprises at least one member selected from the group consisting of amine-containing polyester, amine-containing polyacrylate, amine-containing polycarbonate, amine-containing polyurea, amine-containing polybutadiene, amine-containing polyether, amine-containing polyamide, and amine-containing polysiloxane.

9. The coated floor according to claim 1, wherein the amine functional compound comprises 3-aminopropyl terminated polydimethylsiloxane.

10. The coated floor according to claim 1, wherein the crosslinked polymer comprises at least one member selected from the group consisting of crosslinked urethane-acrylic polymer, a crosslinked reaction product of a diol with an aliphatic diisocyanate, and a crosslinked reaction product of a diol with an aromatic diisocyanate.

11. The coated floor according to claim 1, wherein the crosslinked polymer comprises a crosslinked polyurethane comprising a reaction product of a diisocyanate with a dial, wherein the diisocyanate comprises at least one member selected from the group consisting of isophorone diisocyanate, hexamethylene diisocyanate, toluene diisocyanate, and diphenylmethane diisocyanate, and the dial comprises at least one member selected from the group consisting of a dial-containing a polyester, a dial-containing a polyacrylate, a dial-containing polycarbonate, a dial-containing a polyurea, a dial-containing a polybutadiene, a dial-containing a polyether, and a dial-containing a polyamide, and a dial containing polyurethane.

12. A floor coating composition for making a chemically-strippable, ethanol-resistant floor coating, the composition comprising:
   (A) an aqueous dispersion of at least one crosslinkable polymer selected from the group consisting of crosslinkable polyurethane, crosslinkable acrylic polymer, and crosslinkable polyurea; and (B) alkali soluble resin;
(C) an amine functional compound
(D) a crosslinker for the crosslinkable polymer; and
wherein the floor coating composition, when applied to a flooring substrate as four 0.1 mil thick coats, exhibits:
  (i) a Strippability Level of at least 40% as measured by percent coating stripped from a tile after 300 cycles using a Modified ASTM D1792-82 Strippability Test Procedure with a stripping solution consisting of 4 wt % monoethanolamine, 1 wt % diethyleneglycol butylether, 0.1% ethylenediamine tetracetic acid, 0.25 wt % Cg-11 alcohol ethoxylate, 2.6 wt % benzyl alcohol, and 92.05 wt % water, and
  (ii) an Ethanol Resistance of at least 60 percent, as measured by a 60° Gloss Retention Test re upon exposure to 0.33 milliliter/in2 of a blend of 67.5 wt % ethanol and 32.5 wt % water for a period of 60 minutes at 72° F. and relative humidity of 50%, wherein:

$$R_{E1} = \%60° \text{ Gloss Retention}_{E1} = 100\% - [(60° \text{ GU@}T_o - 60° \text{ GU@}T_{E1})/60° \text{ GU@}T_o] \times 100\%.$$

13. The floor coating composition according to claim 12, wherein the alkali soluble resin comprises at least one member selected from the group consisting of acrylic-acrylic acid resin, styrene-acrylic acid resin, styrene-α-methyl styrene-acrylic acid resin, styrene-acrylic-acrylic acid resin, styrene-α-methyl styrene-acrylic-acrylic acid resin, acrylic-methacrylic acid resin, styrene-methacrylic acid resin, styrene-methyl styrene-methacrylic acid resin, styrene-acrylic-methacrylic acid resin, styrene-α-methyl styrene-acrylic-methacrylic acid resin, styrene-maleic anhydride resin, and polycarboxypolyamide resin.

14. The floor coating composition according to claim 12, wherein the amine functional compound comprises at least one member selected from the group consisting of amine-containing polyester, amine-containing polyacrylate, amine-containing polycarbonate, amine-containing polyurea, amine-containing polybutadiene, amine-containing polyether, amine-containing polyamide, and amine-containing polysiloxane.

15. The floor coating composition according to claim 12, wherein the coating composition comprises a wax in an amount of from 5 wt % to 15 wt %, based on coating weight.

16. The floor coating composition according to claim 12, further comprising a coalescing agent comprising at least one member selected from the group consisting of an organic solvent and a plasticizer.

17. The floor coating composition according to claim 16, wherein the organic solvent comprises at least one member selected from the group consisting of ethylene glycol, propylene glycol, ethylene glycol ether, pyrrolidone, and the plasticizer comprises at least one member selected from the group consisting of phosphate ester solvent, dibenzoate solvent, monobenzoate solvent, and phthalate solvent.

18. The floor coating composition according to claim 16, wherein the coalescing agent is present in the coating composition in an amount of from 2 wt % to 15 wt %, based on coating composition weight.

19. The floor coating composition according to claim 12, wherein, based on the weight of the coating composition:
  (i) the crosslinkable polymer is present in an amount of from 1 wt % to 50 wt %,
  (ii) the crosslinker is present in an amount of from 1 wt % to 10 wt %,
  (iii) the alkali soluble resin is present in an amount of from 0.1 wt % to 3 wt %, and
  (iv) the amine functional compound is present in an amount of from 0.02 wt % to 1.6 wt %.

20. The floor coating composition according to claim 19, wherein the aqueous dispersion comprises a crosslinkable polyurethane, the alkali soluble resin has a weight average molecular weight of from 500 to 10,000 and an acid number of at least 100.

* * * * *